(12) United States Patent
Meacham et al.

(10) Patent No.: US 9,731,640 B1
(45) Date of Patent: Aug. 15, 2017

(54) MOBILE FALL PROTECTION UNIT FOR FLATBED PLATFORMS

(71) Applicant: SAM CARBIS ASSET MANAGEMENT, LLC, Florence, SC (US)

(72) Inventors: William S. Meacham, Myrtle Beach, SC (US); Matthew Elvington, Lake View, SC (US); Ronald D. Willard, Little River, SC (US)

(73) Assignee: SAM CABRIS ASSET MANAGEMENT, LLC, Florence, SC (US)

( * ) Notice: Subject to any disclaimer, the term of this patent is extended or adjusted under 35 U.S.C. 154(b) by 145 days.

(21) Appl. No.: 14/541,857

(22) Filed: Nov. 14, 2014

Related U.S. Application Data

(60) Provisional application No. 61/904,726, filed on Nov. 15, 2013, provisional application No. 62/025,204, filed on Jul. 16, 2014.

(51) Int. Cl.
| | |
|---|---|
| *B60P 1/00* | (2006.01) |
| *B60R 3/00* | (2006.01) |
| *B62D 39/00* | (2006.01) |
| *E04G 21/32* | (2006.01) |

(52) U.S. Cl.
CPC *B60P 1/00* (2013.01); *B60R 3/00* (2013.01); *B62D 39/00* (2013.01); *E04G 21/3261* (2013.01); *E04G 21/3266* (2013.01); *E04G 21/3295* (2013.01)

(58) Field of Classification Search
CPC ..... E04G 5/14; E04G 5/147; E04G 2005/148; E04G 3/30; E04G 21/3261; E04G 21/3266; E04G 21/3295; B60P 1/00; B60J 5/065; B60R 3/00
USPC .................................................. 182/113, 138
See application file for complete search history.

(56) References Cited

U.S. PATENT DOCUMENTS

| | | | | | |
|---|---|---|---|---|---|
| 2,362,170 | A | * | 11/1944 | Swaisgood | ............... E06C 5/06 14/72.5 |
| 2,612,221 | A | * | 9/1952 | Dellapent | .................. B60J 5/08 160/328 |
| 2,732,118 | A | * | 1/1956 | Reinhardt | ............... E06C 1/397 182/113 |
| 2,812,814 | A | * | 11/1957 | Fogh | ........................ B60J 5/125 160/328 |

(Continued)

FOREIGN PATENT DOCUMENTS

EP     2 119 591     11/2009

OTHER PUBLICATIONS

Carbis Catalog, Flatbed Tarping Systems, pp. 59 and 60, 2011.
Carbis Incorporated, Fall Prevention for the Metals Service Center Institute, Jul. 2013.

*Primary Examiner* — Colleen M Chavchavadze
(74) *Attorney, Agent, or Firm* — Dority & Manning, P.A.

(57) ABSTRACT

A mobile fall protection unit can be maneuvered by hand and brought to a flatbed with readily deployable, temporary fences for worker fall protection. The mobile fall protection unit can include a chassis, which carries a frame, which in turn carries a ladder as well as selectively deployable fall protection devices for worker fall protection. The frame carries a pair of retractable fall barriers separated from each other by about the width of the back of the flatbed.

19 Claims, 13 Drawing Sheets

(56) References Cited

U.S. PATENT DOCUMENTS

| | | | | |
|---|---|---|---|---|
| 2,886,105 | A * | 5/1959 | Lee | B60J 5/125 160/328 |
| 3,363,938 | A * | 1/1968 | Schultz | B60J 7/062 296/100.12 |
| 3,563,342 | A * | 2/1971 | Lasiter | B60R 3/02 182/97 |
| 3,863,899 | A * | 2/1975 | Werner | E04H 17/165 182/113 |
| 4,032,186 | A * | 6/1977 | Pickering | B60J 7/062 296/100.13 |
| 4,572,328 | A * | 2/1986 | Benko | B66F 11/04 182/1 |
| 4,815,562 | A * | 3/1989 | Denny | E04G 21/24 182/138 |
| 4,932,354 | A * | 6/1990 | Kistner | B05B 15/1214 118/305 |
| 5,044,689 | A * | 9/1991 | Evers | B60J 5/125 220/1.5 |
| 5,112,097 | A * | 5/1992 | Turner, Jr. | B60J 7/062 296/100.12 |
| 5,282,663 | A * | 2/1994 | Horton | B60J 5/065 160/118 |
| 5,299,653 | A * | 4/1994 | Nebel | B66F 11/044 182/113 |
| 5,403,024 | A * | 4/1995 | Frketic | B62B 3/06 280/43.12 |
| 5,588,500 | A * | 12/1996 | Yonahara | E04G 1/22 182/113 |
| 5,967,258 | A * | 10/1999 | Scott | B66F 11/044 182/112 |
| 6,003,633 | A * | 12/1999 | Rolson | E06C 5/02 182/106 |
| 6,183,036 | B1 * | 2/2001 | Coulson | B60J 7/062 296/100.13 |
| 6,502,709 | B1 | 1/2003 | Parker | |
| 6,578,666 | B1 * | 6/2003 | Miller | B60R 3/007 182/106 |
| 6,598,704 | B2 * | 7/2003 | Hansen | B60R 3/005 108/134 |
| 6,655,726 | B2 * | 12/2003 | Bergeron | B60J 7/102 296/100.01 |
| 6,877,794 | B2 * | 4/2005 | Bush, Sr. | B62D 33/02 296/183.1 |
| 7,036,798 | B1 * | 5/2006 | Olson | E01F 7/025 239/289 |
| 7,037,056 | B2 * | 5/2006 | Lynch | B60P 7/0876 410/97 |
| 7,287,807 | B2 * | 10/2007 | Bowling | B60P 3/04 296/105 |
| 7,316,531 | B2 * | 1/2008 | Whitehead | B60P 3/42 410/37 |
| 7,425,030 | B2 * | 9/2008 | Warner | B60P 7/0876 296/100.11 |
| 7,530,626 | B2 | 5/2009 | Rohatinovici | |
| 7,661,755 | B2 * | 2/2010 | Harrison | B62D 33/0207 296/186.1 |
| 7,798,559 | B2 * | 9/2010 | Bowling | B60P 3/04 296/186.2 |
| 7,802,652 | B2 * | 9/2010 | Bennett | B65G 69/22 182/130 |
| 7,832,525 | B2 * | 11/2010 | Bennett | B65G 69/22 182/36 |
| 7,942,472 | B2 * | 5/2011 | Whitehead | B62D 33/0222 296/186.1 |
| 8,056,237 | B1 * | 11/2011 | Candler | E04G 21/3219 182/113 |
| 8,087,443 | B2 | 1/2012 | Snyder et al. | |
| 8,251,179 | B2 * | 8/2012 | Anderson | B60R 3/007 182/106 |
| 8,573,673 | B1 * | 11/2013 | Puglisi, Sr. | E06C 5/02 182/127 |
| 8,616,332 | B2 | 12/2013 | Witlam et al. | |
| 8,627,925 | B2 * | 1/2014 | Webster | B66F 9/127 182/113 |
| 8,640,826 | B1 * | 2/2014 | Beilstein | E06C 5/02 114/362 |
| 8,662,251 | B2 * | 3/2014 | Hansen | B60P 1/00 182/113 |
| 8,746,403 | B1 * | 6/2014 | Tyner | E06C 1/30 182/106 |
| 8,911,001 | B1 * | 12/2014 | Verrochi | B60J 5/0497 296/186.2 |
| 9,126,536 | B2 * | 9/2015 | Meacham | B60R 3/005 |
| 9,333,991 | B2 * | 5/2016 | Petelka | B60J 5/065 |
| 2005/0002766 | A1 * | 1/2005 | Hartmann | B62B 5/06 414/467 |
| 2006/0054392 | A1 * | 3/2006 | MacDonald | B66F 11/04 182/113 |
| 2006/0163002 | A1 * | 7/2006 | Langsmead | E04G 5/00 182/113 |
| 2007/0074935 | A1 * | 4/2007 | Zahn | B66F 9/07545 182/141 |
| 2011/0226548 | A1 * | 9/2011 | Witlam | A62B 35/0056 182/3 |
| 2012/0006619 | A1 * | 1/2012 | DuBose | B60P 1/00 182/113 |
| 2012/0018691 | A1 * | 1/2012 | Roth | E01F 13/028 256/21 |
| 2012/0138386 | A1 | 6/2012 | Robitaille | |
| 2013/0062585 | A1 * | 3/2013 | Deering | E01F 13/022 256/65.01 |
| 2016/0138338 | A1 * | 5/2016 | Olson | E06C 1/39 182/113 |
| 2016/0145939 | A1 * | 5/2016 | Smith | E04G 5/14 182/113 |

\* cited by examiner

MOBILE FALL PROTECTION UNIT FOR FLATBED PLATFORMS

CROSS REFERENCE TO RELATED APPLICATIONS

The present application hereby claims priority to and incorporates herein in their entirety by this reference for all purposes the contents and disclosures of: U.S. Provisional Patent Application Ser. No. 61/904,726 filed Nov. 15, 2013 and U.S. Provisional Patent Application Ser. No. 62/025,204 filed Jul. 16, 2014.

STATEMENT REGARDING FEDERALLY SPONSORED RESEARCH OR DEVELOPMENT

Not applicable.

FIELD OF THE INVENTION

The subject matter disclosed herein generally involves a fall protection system for workers loading and unloading flatbeds.

BACKGROUND OF THE INVENTION

Flatbeds are used for transporting cargo and can take several forms such as flatbed trucks, detachable flatbed trailers and flatbed rail cars. When these flatbeds can be maneuvered into a loading bay where the cargo can be loaded onto the flatbed or unloaded from the flatbed, infrastructure typically is available to provide fall protection for the workers who perform the loading and unloading functions. However, worker fall protection typically is not available when the flatbed is isolated from such infrastructure. Similarly, when the number of flatbeds needing to be loaded or unloaded exceeds the number of available loading bays at the facility, worker fall protection typically is not available for the excess flatbeds, leading to costly delays in the loading/unloading process. Additionally, maneuvering a flatbed into a particular bay where worker fall protection is available requires an available tractor to connect to the flatbed and a competent driver of the tractor in order to complete this maneuver. This process too results in costly delays in the loading/unloading process.

BRIEF DESCRIPTION OF THE INVENTION

Some of the aspects and advantages of the invention are set forth below in the following description, or may be obvious from the description, or may be learned through practice of embodiments of the invention.

One embodiment of the invention includes a mobile fall protection unit that can be maneuvered by hand and brought to the flatbed with readily deployable, temporary fences for worker fall protection. The mobile fall protection unit can include a chassis that desirably is carried above the underlying ground by a plurality of rotatable wheels. Desirably, two wheels are mounted at the rear of the chassis and two wheels are mounted at the front of the chassis, one front wheel carrying each of the front two legs. The front of the chassis has a width between the two front wheels that is approximately equal to, but slightly larger than, the width of the rear end of a flatbed. The rear wheels can be mounted close together on a rear wheel carriage that is pivotally mounted with respect to the rear of the chassis. The rear wheel carriage can be steered by a handle that itself is pivotally connected to the rear wheel carriage between a storage position and a towing position. The chassis can be steered by hand or moved by a vehicle into an operating position that places the front end of the chassis against the rear end of a flatbed. To keep the front of the chassis snug against the back end of the flatbed, a respective tie strap desirably extends from each respective front leg of the chassis to a respective one of the respective rub rails that extends along each of the two longitudinally extending sides of the flatbed. The chassis carries a pair of retractable fall barriers separated from each other by about the width of the back of the flatbed. The bottom border of each retractable fall barrier desirably is disposed at an elevation just beneath the height of the flatbed and anchored by a lower cable that can have its tension adjusted by a manually operable lower winch carried on the front leg.

Each retractable fall barrier can include a fencing panel that is hung from rings threaded on an upper cable that is strung between vertical stanchions and that is tensioned by a manually operated upper winch that is carried by the chassis. The fencing panel desirably is formed as drapeable web or mesh that is rectangular in shape with a width that is the desired height of a fall protection fence for a flatbed. The length of the fencing panel is intended to be long enough to stretch at least from the rear end of the flatbed along the longest side of the flatbed to the front end of the flatbed. The fencing panel desirably is stored in an accordion-like folded condition on a storage rod that has one end connected to the upper portion of a front leg and elongates to a free end in a horizontal direction parallel to the ground. When the operator decides to deploy the fencing panel, the operator pulls the fencing panel away from the storage rod on the front leg. Each fencing panel can be pulled manually along the upper cable and deployed along one side of the flatbed and attached temporarily to a selectively positionable post that can be anchored at the front end of the flatbed where typically a bulkhead is located. Once the winch is set to the proper condition of tension in the cable, then this chassis-based, fall protection device is ready to be used while workmen are working on top of the walking surface of the flatbed.

The mobile fall protection unit can include a ladder carried by the frame at the front of the chassis and selectively positionable between the two front legs of the chassis. The ladder can be pivotally mounted so that it can be deployed selectively as a step ladder from the ground to the height of the flatbed or folded up for storage between the two front legs of the chassis. The ladder also is easily detachable from the frame at the front of the chassis so that the ladder can be positioned selectively by the user to either side of the frame at the front of the chassis. The frame at the front of the chassis also desirably is provided with stationary fence posts from which can be hung chains or other constraints that provide selectively removable fall protection to the rear of the flatbed.

The shadow that the chassis casts on the underlying ground desirably is an outline that has a T-shape with the frame at the front end of the chassis forming the top of the "T". The handle has a lower end pivotally connected to the rear wheel carriage. The handle is shaped so that when pivoted with the free end of the handle pointing to the front of the chassis, the free end of the handle is angled upwardly relative to the horizontal plane that is parallel to the ground. The handle so shaped and the T-shaped chassis enable a plurality of the mobile fall protection units to be stored together in a compact arrangement by having the front end of a first chassis slide over against the rear end of a second chassis and permit the front end of the second chassis to slide over against the rear end of a third chassis and so on in the same manner with additional chasses of mobile fall protection units. In this way the chasses of several mobile fall protection units can be successively nested with respect to one another in a line for storage when not in use without taking up an inordinate amount of space in the loading area.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in this specification, including reference to the accompanying figures, in which.

Figure 1:
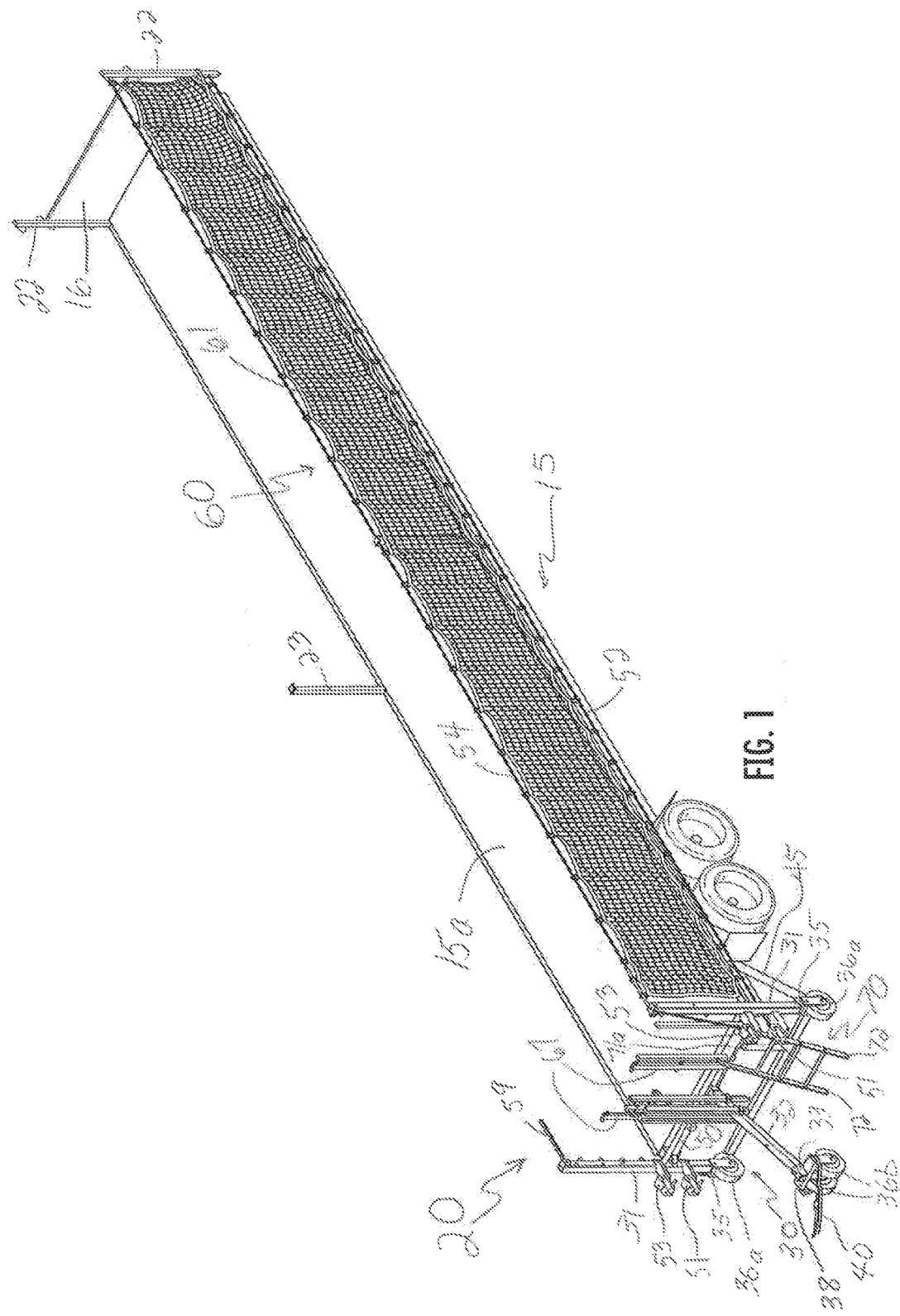
FIG. 1 is an elevated perspective view of an embodiment of the present invention deployed on a trailer bed.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to exemplary embodiments of the invention, one or more examples of which are illustrated in the accompanying drawings. The detailed description uses numerical and letter designations to refer to features in the drawings. Like or similar designations in the drawings and description have been used to refer to like or similar parts.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

It is to be understood that the ranges and limits mentioned herein include all sub-ranges that exist within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

As used herein, the horizontal generally defines a direction that is normal to the direction in which the force of gravity acts and thus is generally parallel to the underlying ground surface. The vertical generally defines a direction that is parallel to the direction in which the force of gravity acts and thus is generally normal to the horizontal and normal to the underlying ground surface.

One embodiment of components of the mobile fall protection unit of the present invention in a partially deployed mode of operation is shown in a perspective view in FIG. 1 and generally designated by the numeral 20. As explained more fully below, a presently desirable embodiment of the mobile fall protection unit 20 desirably includes a chassis 30, which is connected to a frame 50, which in turn carries a ladder 70 as well as selectively deployable fall protection devices 60, 67 for worker fall protection. As shown in FIG. 1 for example, an embodiment of the mobile fall protection unit 20 has been brought to the rear end of a flatbed trailer, which is generally designated by the numeral 15.

Figure 2:
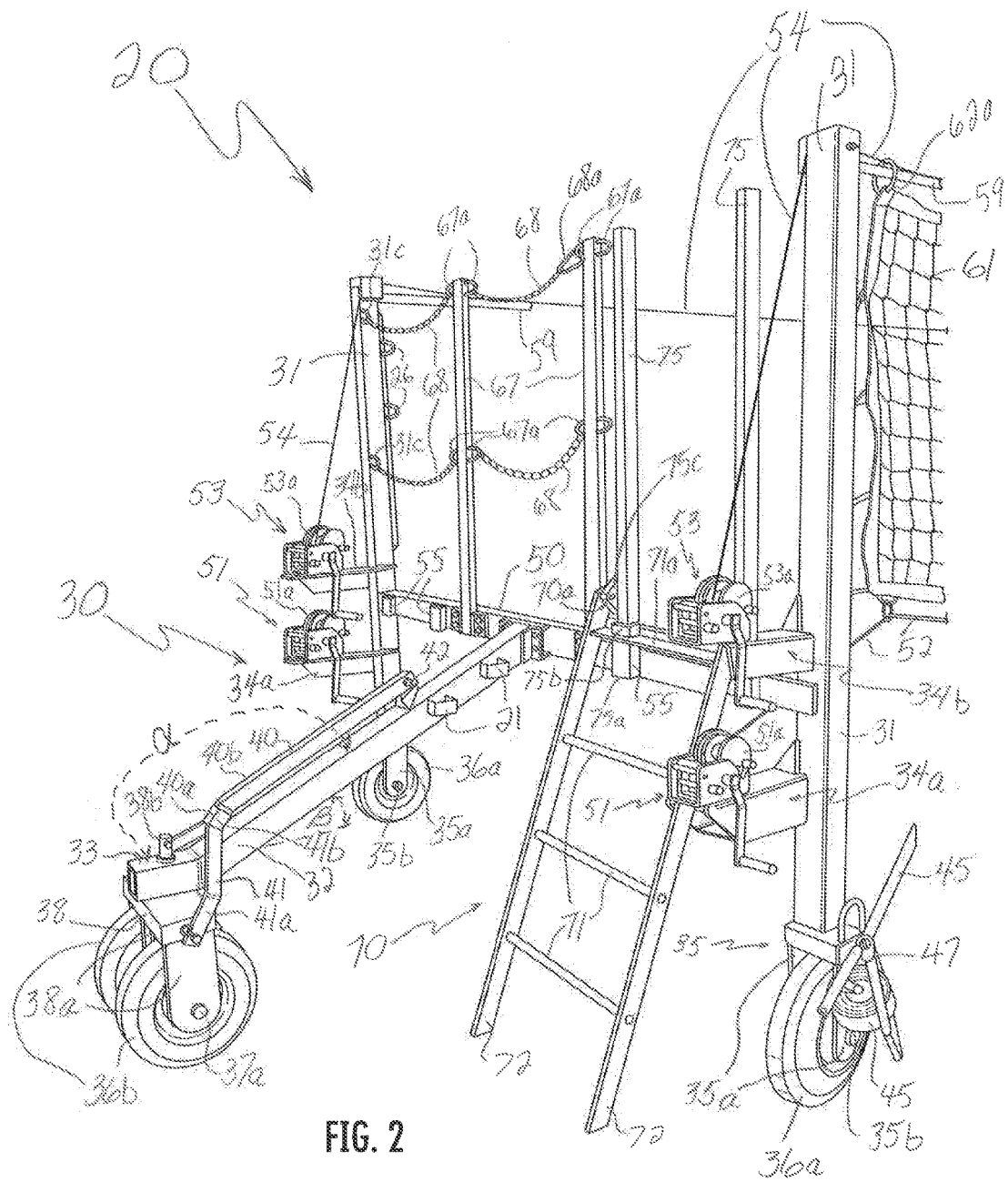
FIG. 2 is an enlarged elevated perspective rear view of components of the embodiment of the present invention depicted in FIG. 1.
Figure 2A:
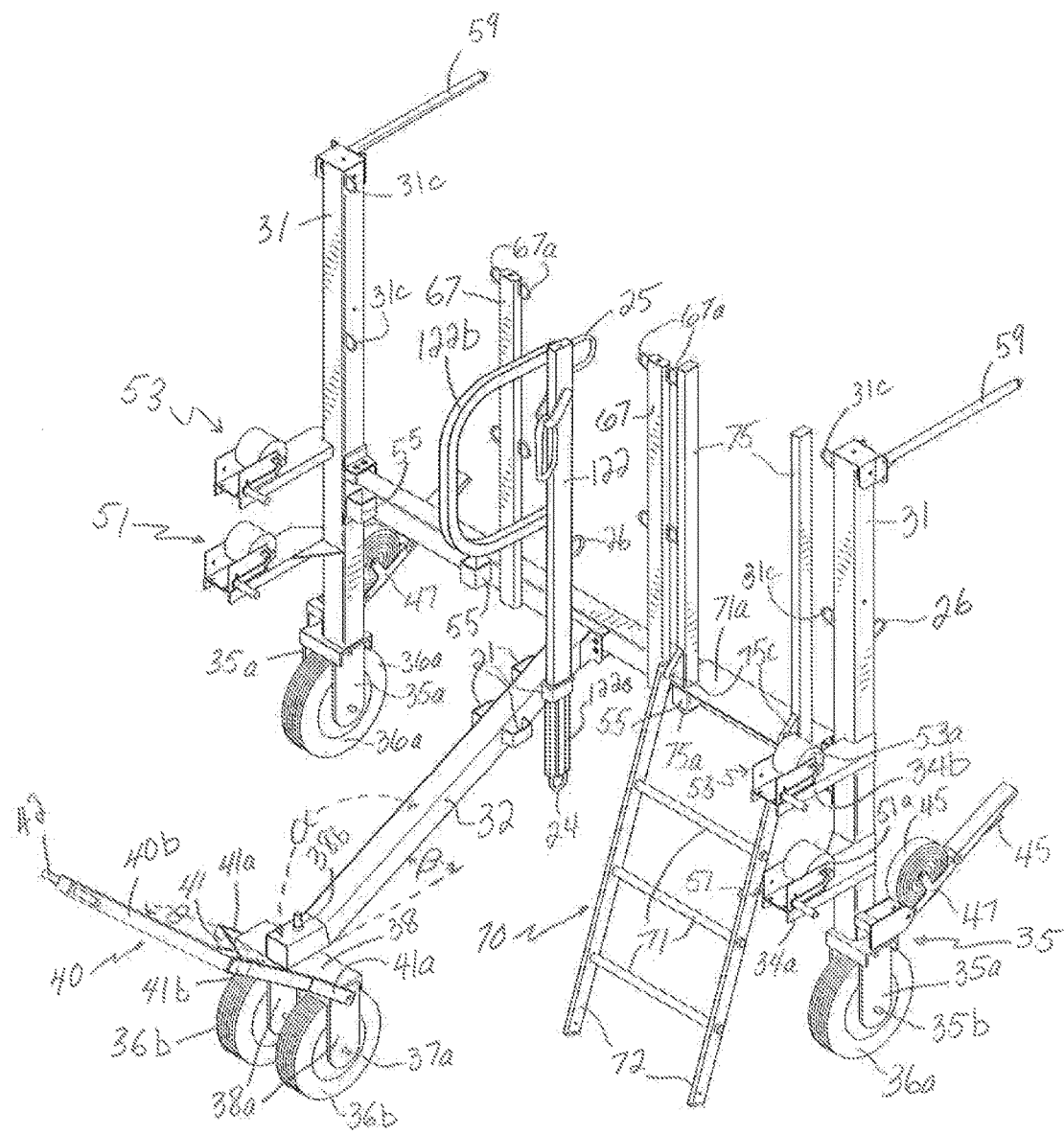
FIG. 2A is an enlarged elevated perspective rear view of components of an alternative embodiment of the present invention depicted in FIG. 1.
Figure 3:
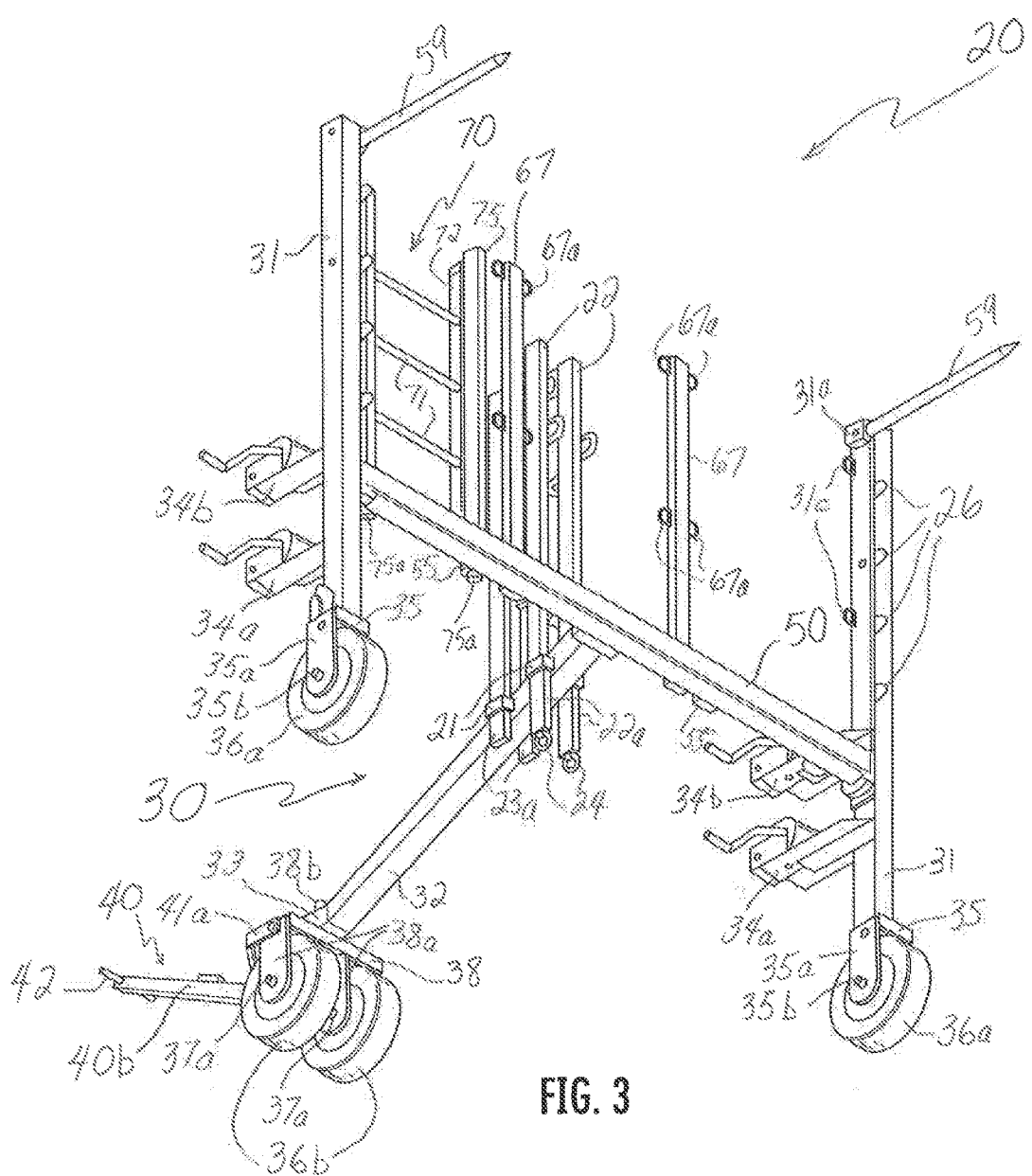
FIG. 3 is an elevated perspective view taken from underneath the front of components of the embodiment of the present invention depicted in FIGS. 1 and 2.

Referring to FIGS. 2, 2A and 3 for example, an embodiment of a mobile fall protection unit 20 can include a chassis, which is generally designated by the numeral 30. The chassis 30 desirably includes a pair of horizontally spaced apart front legs 31. Each front leg 31 desirably is formed by a straight length of tubular steel having a square transverse cross-sectional shape as shown in FIGS. 2, 2A and 3 for example. As shown in FIG. 1 for example, the spacing between the front legs 31 is designed to be approximately slightly greater than the anticipated width of the walking surface 15a of the flatbed 15.

As shown in FIGS. 2, 2A and 3 for example, each front leg 31 has a bottom end connected, as by welding, to a front wheel carriage 35. Each front leg 31 elongates to extend vertically from its respective front wheel carriage 35. Each of the front wheel carriages 35 includes a pair of downwardly pending members 35a that are spaced apart from each other to form a front wheel fork. The depending members 35a of each front wheel fork are spaced apart just enough so that a front wheel 36a is rotatably mounted between them. Each of the two front wheels 36a at the front end of the chassis 30 rotates about a commonly disposed axis of rotation 35b.

As shown in FIGS. 2, 2A and 3 for example, a rear wheel carriage 38 desirably is spaced horizontally apart from and to the rear of the two front legs 31. Each rear wheel 36b rotates about its own rear wheel axle 37a, the opposite ends of which being held between a pair of spaced apart depending members 38a of the rear wheel carriage 38. Each of the two front legs 31 and the rear wheel carriage 38 is disposed at one of the three vertices of a triangular footprint. The chassis 30 desirably is carried by the wheels 36a, 36b that render the mobile fall protection unit 20 mobile. While the wheels 36a, 36b are not self-propelled, the mobile fall protection unit 20 desirably can be maneuvered by hand and/or by connection to a self-propelled vehicle that can push or pull the mobile fall protection unit 20 on its wheels 36a, 36b. As shown in FIGS. 1-3, 5 and 5A for example, each of the four independently rotatable wheels 36a, 36b desirably is a solid, hard rubber wheel.

As noted above, the mobile fall protection unit 20 includes a frame 50. As shown in FIGS. 2, 2A and 3 for example, the frame 50 desirably elongates in straight line and has one end connected, as by welding, to the inward side of one of the front legs 31 and an opposite end similarly connected to the other one of the front legs 31. Alternatively, each of the opposite ends of the frame 50 desirably can be connected to a respective leg 31 by threaded bolts and nuts for example. Desirably, the frame 50 is connected to the front legs 31 so that the horizontally disposed uppermost free edges of the frame 50 are disposed at a sufficient height above the ground so that the uppermost free edges of the frame 50 are disposed at a height that is approximately equal to or slightly less than the anticipated height of the walking surface 15a of the flatbed 15 shown in FIG. 1 for example.

As shown in FIGS. 2, 2A and 3 for example, in addition to the two front legs 31 and the rear wheel carriage 38, the chassis 30 also includes a spinal member 32 that desirably elongates in a straight line and has one end connected to the frame 50 at a location that desirably is disposed midway between the two opposite ends of the frame 50. As shown in FIGS. 2 and 2A for example, the opposite end of the spinal member 32 desirably is connected to one opposite end of a branch member 33 that elongates in a straight line, which as shown in FIG. 2A is disposed at an angle α with respect to the straight line direction of elongation of the spinal member 32. The angle α desirably is an obtuse angle in a range of about 120 degrees to about 165 degrees. Thus, the end of the spinal member 32 connected to the frame 50 is disposed at a higher elevation above the rear wheel carriage 38 than the elevation of the end of the spinal member 32 that is pivotally connected to the rear wheel carriage 38. The branch member 33 desirably is pivotally connected to the rear wheel carriage 38 and disposed so that its direction of elongation is parallel with the horizontal plane that is itself parallel to the underlying ground surface.

Figure 8:
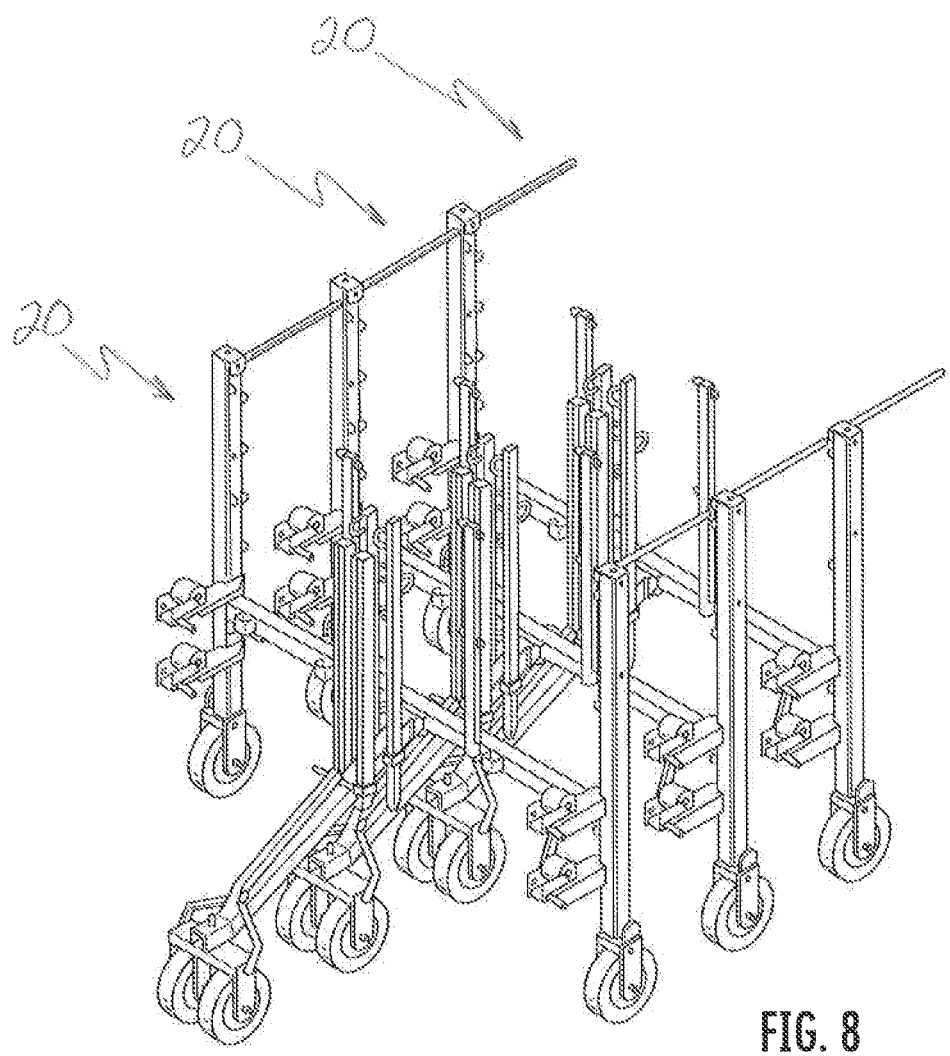
FIG. 8 is an elevated perspective view of a several units of an embodiment of the present invention shown in a storage mode.

As shown in FIGS. 2 and 2A for example, the spinal member 32 of the chassis 30 elongates substantially in a straight line in a direction. As shown in FIG. 2A, the spinal member 32 of the chassis 30 elongates in a direction that is disposed at an angle β above the plane that is parallel to the ground and parallel with the direction of elongation of the branch member 33. Thus, the two angles α, β are complementary. As shown in FIG. 8 for example, this tripod footprint and upwardly angled orientation of the spinal member 32 of the chassis 30 lends itself to the ability to nest multiple mobile fall protection units 20 into one another in a nested storage arrangement that minimizes the floor space taken up by the stored units 20.

Each of the front legs 31 of the chassis 30, the spinal member 32 and the branch member 33 desirably is formed of a strong rigid material such as a tubular steel member with a hollow interior. Similarly, the frame 50 also desirably is formed of a strong rigid material such as a tubular steel member with a hollow interior. For example each of the front legs 31 of the chassis 30 desirably is formed of tubular steel, which desirably is powder-coated but can be galvanized, that has hollow square transverse outer dimensions measuring four inches by four inches with the walls measuring three sixteenths of an inch thick. Similarly, each of the frame 50 and the spinal member 32 and the branch member 33 of the chassis 30 desirably is formed of hollow tubular steel, which desirably is powder-coated but can be galvanized, that has square transverse outer dimensions measuring four inches by four inches and walls measuring three sixteenths of an inch thick.

As shown in FIGS. 2, 2A and 3 for example, the rear wheels 36b can be mounted close together on the rear wheel carriage 38, which is pivotally mounted with respect to the spinal member 32 and the branch member 33 of the chassis 30. The rear wheel carriage 38 is pivotally connected via a pivot post 38b to the branch member 33 of the chassis 30.

The chassis 30 is configured so that it can be steered by hand or moved (pulled or pushed) by a vehicle into an operating position that places the frame 50 and front end of the chassis 30 against the back end of a flatbed 15 as shown in FIGS. 1, 2A 5 and 5A for example. As shown in FIGS. 1-3 for example, the pivotally connected rear wheel carriage 38 desirably can be steered by an angled handle 40. As shown in FIGS. 2 and 2A for example, the handle 40 desirably is pivotally connected to the rear wheel carriage 38 via the two more widely spaced apart ends 41a of the legs of a steering fork 41. The more narrowly spaced apart ends 41b of the legs of the steering fork 41 are disposed opposite the more widely spaced apart ends 41a of the legs of the steering fork 41 and are connected to a shorter leg 40a of the angled handle 40.

The handle 40 desirably is formed as a unitary structure of tubular steel having a square transverse cross-sectional shape. However, the shorter leg 40a and a longer leg 40b of the handle 40 meet to form a bend at an obtuse angle θ, which desirably measures about 165 degrees as schematically shown in FIG. 2A for example. As schematically shown in FIG. 5A for example, the angle ψ between the steering fork 41 and the longer leg 40b of the handle 40 is about 196 degrees. The mud flaps 14 behind the rear wheels of the flatbed 15 also are schematically depicted in FIG. 5A.

As shown in FIGS. 2 and 2A for example, a pull-bar 42 is disposed near the free end of the longer leg 40b of the handle 40 and extends transversely with respect to the longer leg 40b of the handle 40. Though the handle 40 is shown in the storage position in FIGS. 2 and 8 for example, each of FIGS. 1 and 2A depicts the handle 40 in a different towing position. The handle 40 has this range of pivotal movement between the storage position depicted in FIGS. 2 and 8 and the towing position shown in FIG. 1.

Three mobile fall protection units 20 are shown in FIG. 8 resting against each other in a nested arrangement, which is a relative orientation suited for storage of the mobile fall protection units 20 in a minimum amount of space. The handle 40 of each fall protection unit 20 shown in FIG. 8 has a lower end pivotally connected to the rear wheel carriage 38 in which the two rear wheels 36b are rotatably supported.

The handle 40 is shaped so that when pivoted with the free end of the handle 40 pointing to the front of the chassis 30 as in FIGS. 2 and 8 for example, the free end of the handle 40 is angled upwardly relative to the horizontal plane in which the ground resides. As shown in FIG. 8 for example, the handle 40 so shaped and the chassis 30 so shaped enable a plurality of the mobile fall protection units 20 to be stored together in a compact nested arrangement by having the rear of a chassis 30 nest within the wedge-shaped space in the rear of a neighboring chassis 30 and successively permitting the rear of another neighboring chassis 30 to nest within the wedge-shaped space within the rear of its wedge-shaped chassis 30. Thus, both the chasses 30 and the handles 40 are shaped to allow the nesting storage arrangement shown in FIG. 8. In this way the mobile fall protection units 20 can be stacked for storage when not in use without taking up an inordinate amount of space in the loading area.

Figure 5:
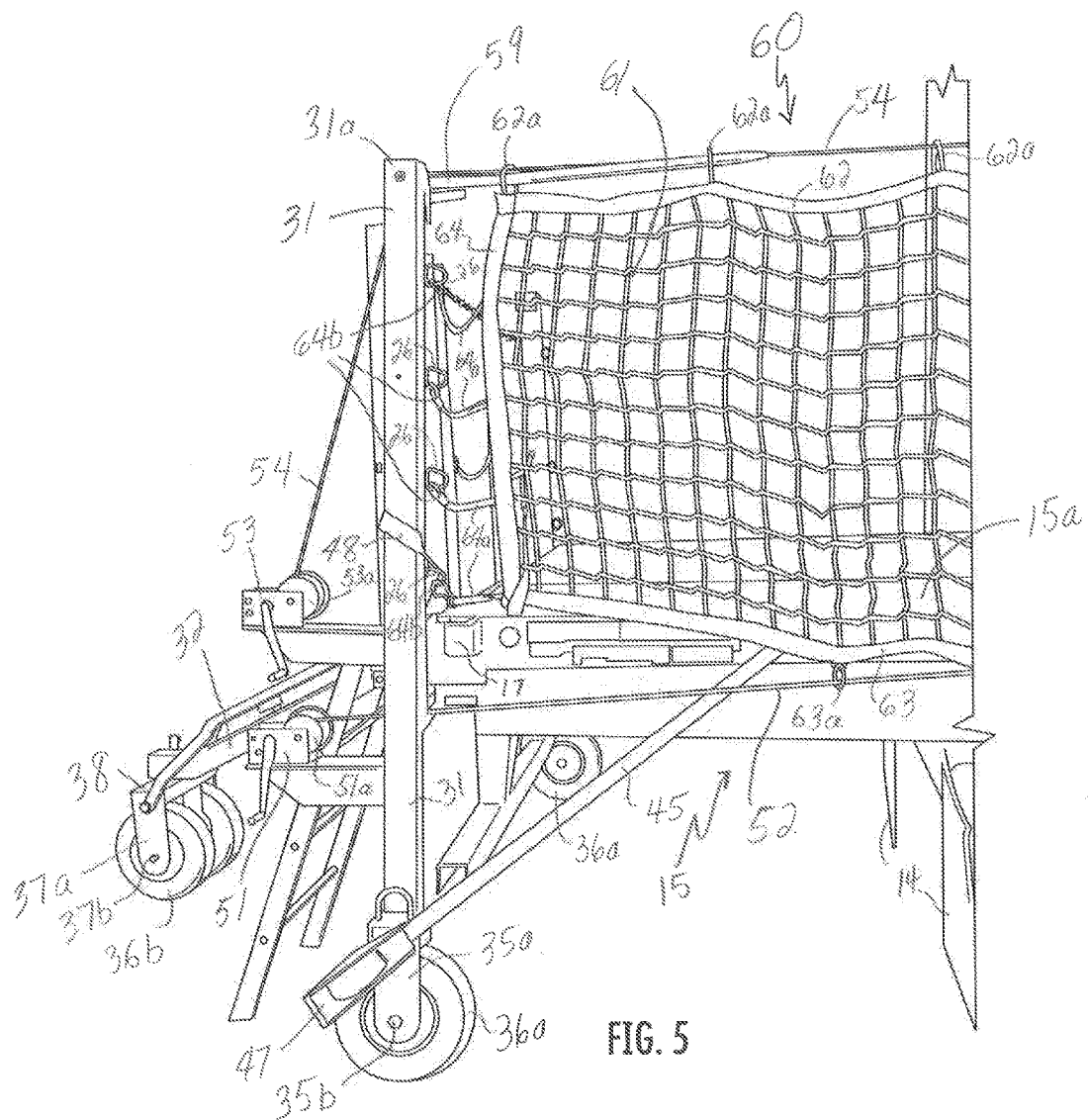
FIG. 5 is an elevation of the right side of components of the embodiment of the present invention depicted in FIGS. 1-4 in operation to provide worker fall protection to a flatbed.
Figure 5A:
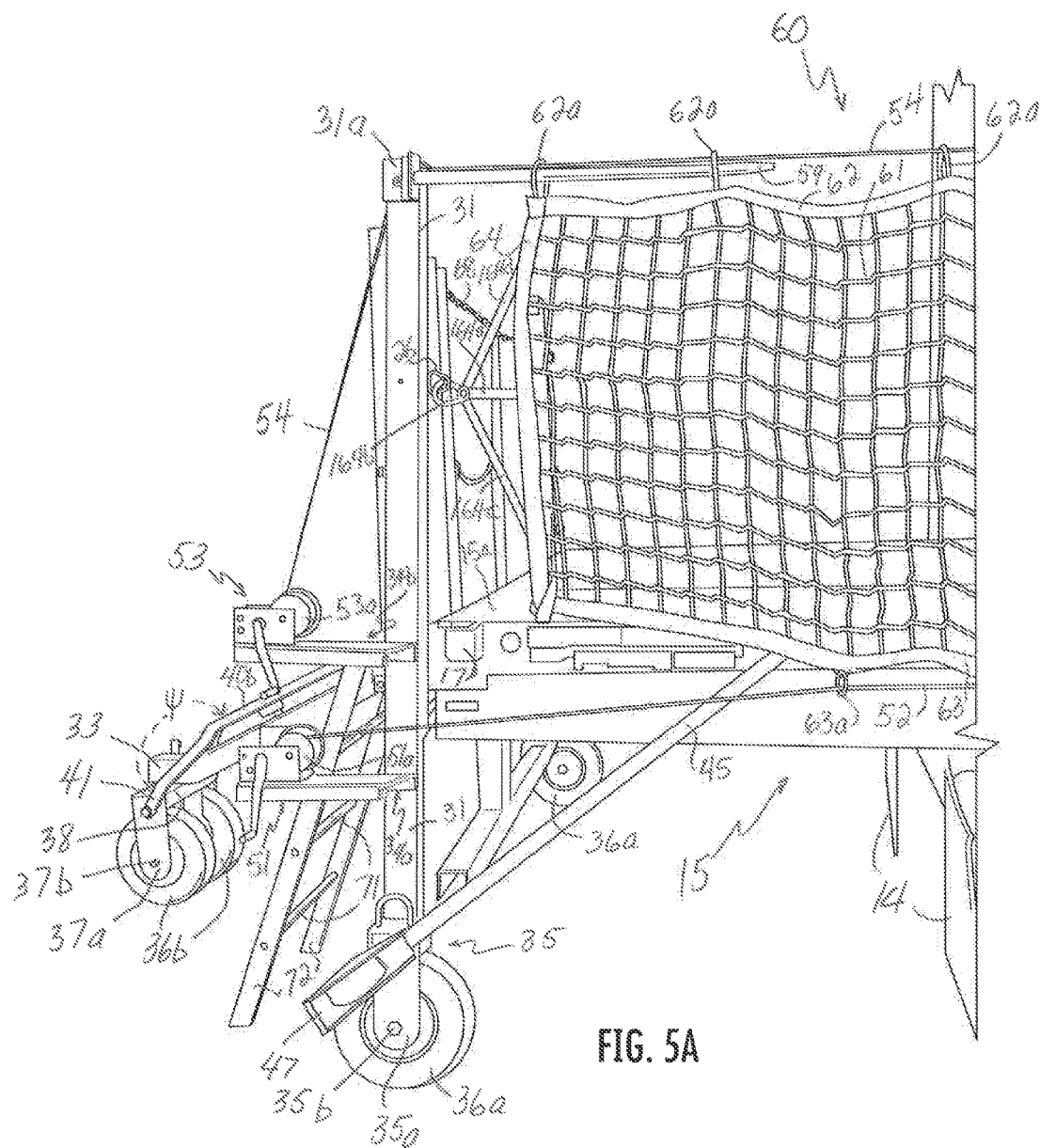
FIG. 5A is an elevation of the right side of components of the embodiment of the present invention depicted in FIG. 2A in operation to provide worker fall protection to a flatbed.

As shown in FIGS. 5 and 5A for example, each embodiment of the mobile fall protection unit 20 desirably includes a pair of tie straps 45. One respective tie strap 45 desirably is provided on a respective one of each of the two legs 31 of the chassis 30. As shown in FIGS. 5 and 5A for example, one end of each tie strap 45 desirably can be anchored to a respective one of the front legs 31. As shown in FIG. 5 for example, one end of each tie strap 45 desirably can be anchored to the outwardly facing depending member 35a of the respective front wheel carriage 35. As shown in FIG. 5A for example, one end of each tie strap 45 desirably can be anchored to the outwardly facing portion of the top of the respective front wheel carriage 35 from which the depending member 35a hangs. Each tie strap 45 is long enough to extend from one side of the front leg 31 to one of the respective sides of the flatbed 15. The opposite end of each tie strap 45 desirably terminates in a hook (not visible in the view of FIG. 5) that can be secured to the side of the flatbed 15. As shown in FIGS. 2, 2A, 5 and 5A for example, each tie strap 45 is selectively deployable from and storable on a length-adjustable tensioning device 47 that desirably is provided so that the operator readily can select the length of the tie strap 45 necessary to the securing task. The length-adjustable tensioning device 47 can be set by the operator to maintain tension at the desired length of the tie strap 45 to ensure that the front of the frame 50 remains snugly against the rear end of the flatbed 15.

As shown in FIGS. 2, 2A and 3 for example, connected to each opposite side of the spinal member 32 of the chassis 30, there is at least one stanchion pocket 21 that desirably is formed by a strip of metal bent to the configuration of a sleeve with a rectangular transverse cross-sectional shape and open at the top and bottom. As shown in FIGS. 2, 2A and 3 for example, the stanchion pocket 21 desirably is welded to the side of the spinal member 32. Desirably, two stanchion pockets 21 are disposed on each side of the spinal member 32. As shown in FIG. 3 for example, each stanchion pocket 21 is configured to receive therein a respective lower section 22a, 23a of a respective vertically elongating rigid stanchion 22 or 23. Additionally, the respective lower section 22a or 23a of each such stanchion 22 or 23 desirably is configured to be received easily and snugly into the type of stanchion pocket 17 that conventionally is found disposed along the sides of a flatbed 15 as shown in FIGS. 5, 5A, 6 and 7 for example.

Figure 7:
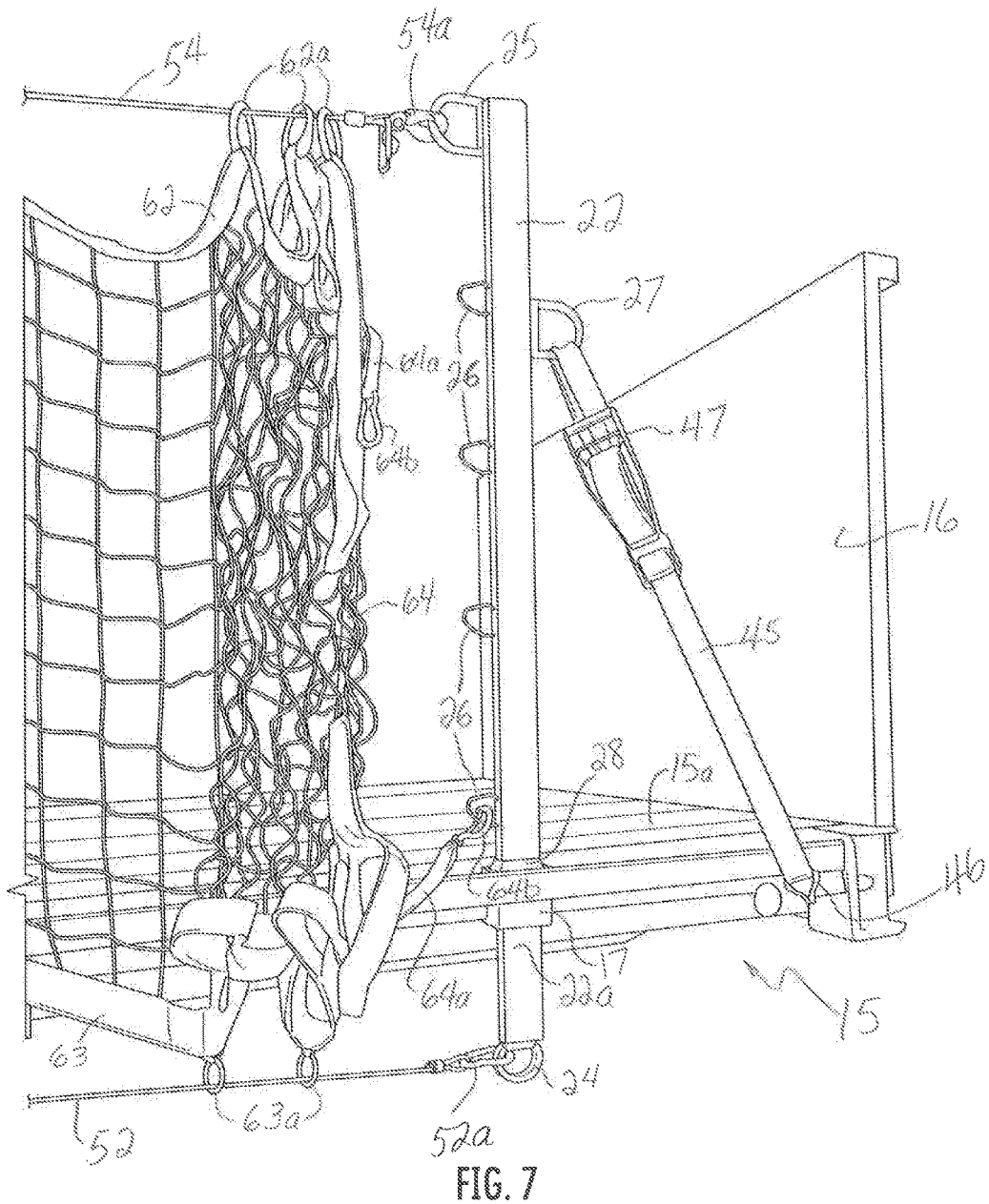
FIG. 7 is a side perspective view of components of an embodiment of the present invention deployed near the bulkhead of a flatbed trailer.
Figure 7A:
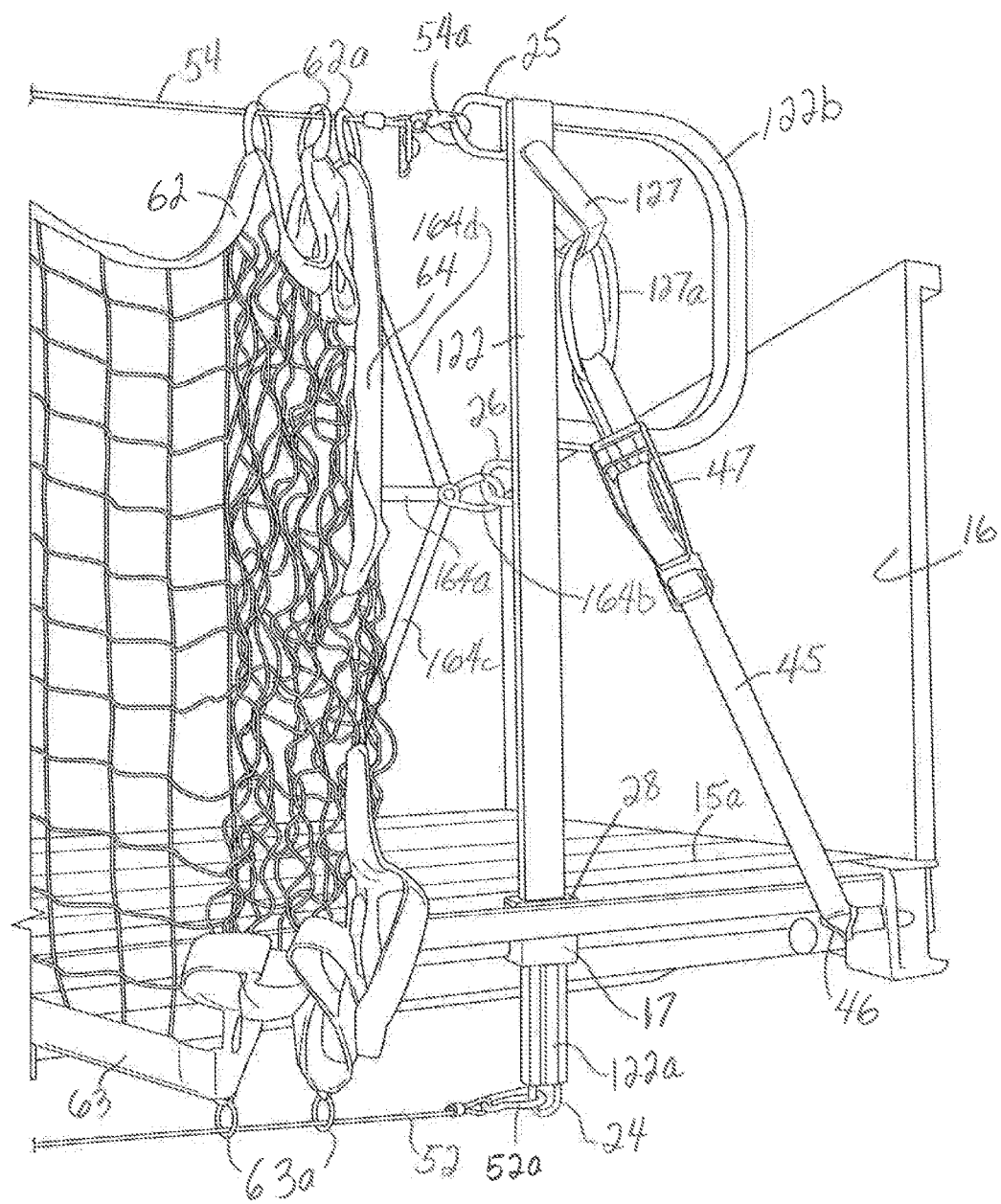
FIG. 7A is a side perspective view of components of an alternative embodiment of the present invention deployed near the bulkhead of a flatbed trailer.

As shown in FIGS. 1, 3, 7 and 7A for example, one of the vertically elongating rigid posts that can be stored on each side of the spinal member 32 is a front anchor stanchion 22 or 122. As shown in FIGS. 2A and 7A for example, a presently preferred embodiment of a vertically elongating rigid post that can be stored on each side of the spinal member 32 is a front anchor stanchion 122. As shown in FIGS. 7 and 7A for example, the lower end of each respective embodiment of a front anchor stanchion 22, 122 terminates in a sturdy ring 24, which desirably is formed of powder-coated steel but also can be formed of galvanized steel. A sturdy loop 25, which desirably is formed of powder-coated steel but also can be formed of galvanized steel, is connected to elongate away from the rear edge of the upper end of the front anchor stanchion 22, 122. As shown in FIG. 7 for example, a plurality of eyelets 26 is disposed along the rear edge of the front anchor post 22, and these eyelets 26 desirably are spaced equidistantly apart. As shown in FIG. 7A for example, a single eyelet 26 is disposed along the rear edge of the front anchor post 122, and this single eyelet 26 desirably is disposed at about half the height of the portion of the front anchor post 122 that rises above the walking surface 15a of the flatbed 15 when the lower section 122a of the front anchor stanchion 122 is received through a forward-positioned, conventional stanchion pocket 17 that is formed along the side of a flatbed 15 and positioned near the bulkhead 16 of a flatbed 15.

As shown in FIG. 7 for example, a sturdy loop 27, which desirably is formed of powder-coated steel but also can be formed of galvanized steel, is connected to elongate away from the front edge of the front anchor stanchion 22 and desirably is positioned near the upper end of the front anchor stanchion 22. As shown in FIG. 7A for example, a sturdy loop 127, which desirably is formed of powder-coated steel but also can be formed of galvanized steel, is attached as by welding on the front edge of the front anchor stanchion 122 and desirably is positioned near the upper end of the front anchor stanchion 122 and disposed at a fixed angle of descent of about 45 degrees from the direction of elongation of the front anchor stanchion 122. As shown in FIGS. 7 and 7A for example, a stop collar 28 is disposed between the respective lower section 22a, 122a of the respective front anchor stanchion 22, 122 and the lowest eyelet 26 and is configured and disposed so as to prevent the further descent of the respective front anchor stanchion 22, 122 into one of the stanchion pockets 17 typically found in the side of the flatbed 15. The respective lower section 22a, 122a of the respective front anchor stanchion 22, 122 is the portion of the respective front anchor stanchion 22, 122 that extends between the stop collar 28 and the lower end that terminates in the steel ring 24.

As shown in FIGS. 2A and 7A for example, the presently preferred embodiment of the front anchor stanchion 122 includes a guard rail 122b. The guard rail 122b desirably is formed from a length of ⅛ inch gauge aluminum tubing that has been bent into a C-shape. The outer transverse perimeter of the aluminum tubing forming the guard rail 122b desirably is a square that measures one inch on each side. The two free ends of the guard rail 122b desirably are fixed, as by being bolted, to the upper portion of the front anchor stanchion 122. As shown in FIG. 7A, the guardrail 122b functions to reduce the space between the front anchor stanchion 122 and the bulkhead 16. However, a gap of less than 19 inches desirably can be left between the bulkhead 16 and the guardrail 122b.

As shown in FIGS. 2, 2A, 3 and 5A for example, each of the front legs 31 desirably is provided with a pair of winch platforms 34a, 34b. Each winch platform 34a, 34b elongates in a rearward direction away from the front leg 31 and generally parallel to the direction of elongation of the spinal member 32 of the chassis 30. As shown in FIGS. 2, 2A and 5A for example, each front leg 31 carries a lower winch platform 34*a* disposed beneath and spaced apart from an upper winch platform 34*b*, the former being disposed between the upper winch platform 34*b* and the front wheel carriage 35 of the front leg 31.

As shown in FIG. 5A for example, each winch platform 34*a*, 34*b* carried on each front leg 31 desirably can be formed of a length of C-channel having the end farther from the respective winch 51 or 53 bias cut from front to back where the respective winch 51 or 53 is attached. The respective winch 51 or 53 is attached to the middle portion of the C-channel, which desirably is disposed in a plane that is parallel to the plane of the ground. The opposing depending flanges of the length of C-shaped channel forming each winch platform 34*a*, 34*b* are pointing downward in the same general direction as the bracing panel 39*b* shown in FIG. 4.

Figure 4:
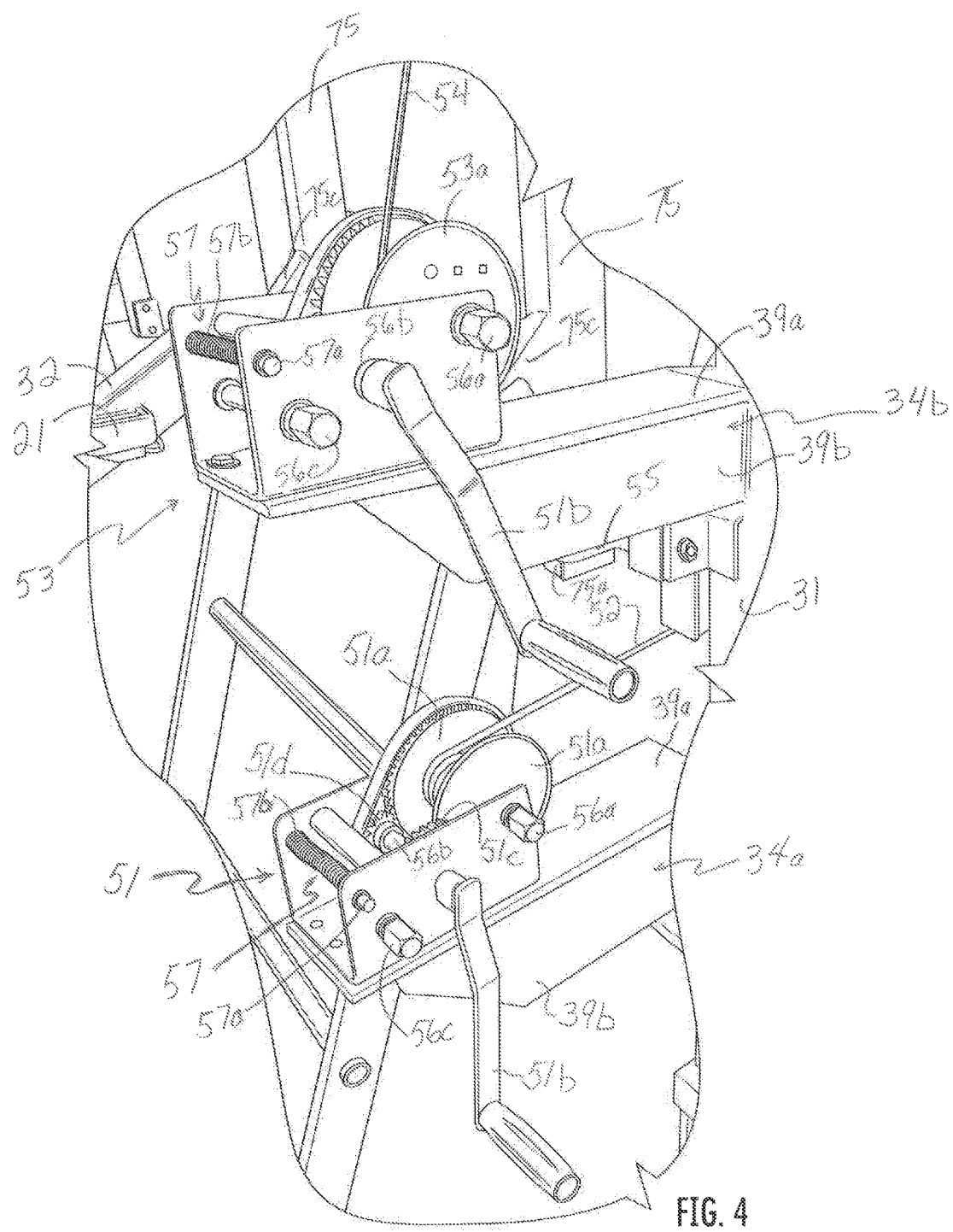
FIG. 4 is an enlarged elevated perspective view from above the right rear of components of an embodiment of the present invention depicted in FIGS. 1-3.

As shown in FIG. 4 for example, each winch platform 34*a*, 34*b* carried on each front leg 31 desirably can include a base 39*a* and a bracing panel 39*b*, which desirably is disposed beneath the base 39*a* so as to support and reinforce the base 39*a*. The base 39*a* desirably can take the form of a flat metal plate shaped like a rectangle having one of the narrower edges welded to the rearward facing side of the front leg 31. The flat upper surface of the base 39*a* of each winch platform 34*a*, 34*b* desirably is disposed in a plane that is parallel to the plane of the ground. The bracing panel 39*b* desirably can take the form of a flat metal plate shaped like a trapezoid having the longer one of the two parallel edges of the bracing panel 39*b* welded to the outwardly facing longer edge of the base 39*a* with the angled edge of the bracing panel 39*b* facing outwardly away from the front leg 31. The remaining edge of the bracing panel 39*b* connects the two parallel edges and desirably elongates in a straight line that is disposed in a direction that is normal to direction in which the lines of the two parallel edges of the bracing panel 39*b* elongate and desirably is welded to the rearward facing side of the front leg 31.

In accordance with the present invention, the mobile fall protection unit 20 desirably includes at least one selectively deployable fall protection device that is at least in part carried by the frame 50. As explained more fully below, the mobile fall protection unit 20 desirably includes several selectively deployable fall protection devices as well as more than one type of selectively deployable fall protection device.

As shown in FIG. 1 for example, one type of selectively deployable fall protection device is a fall barrier 60 that desirably includes a fencing panel 61. As shown in FIGS. 1, 2 and 2A for example, the fall barrier 60 includes the front leg 31, a lower winch 51, and a lower cable 52 selectively deployable from and storable on the lower winch 51, an upper winch 53, and an upper cable 54 selectively deployable from and storable on the upper winch 53. As shown in FIGS. 1, 7 and 7A for example, each fall barrier 60 also includes a front anchor stanchion 22 or 122. The fencing panel 61 desirably is selectively extendable between the front leg 31, which is positioned at one end of the frame 50 of the mobile fall protection unit 20 and positioned at the rear end of the flatbed 15 as shown in FIGS. 5 and 5A, and the front anchor stanchion 22 or 122, which is positioned at the front end of the flatbed 15 near where the bulkhead 16 of the flatbed 15 typically is disposed as shown in FIG. 7 or 7A. When fully deployed as shown in FIG. 1 for example, the fencing panel 61 of the fall barrier 60 will extend along the entire length of one side of the flatbed 15 to the front of the flatbed 15 so as to provide fall protection on one of the opposite elongated sides of the flatbed 15 for workers on the walking surface 15*a* of the flatbed 15. Thus, as shown in FIGS. 1, 5, 5A, 7 and 7A, each respective fencing panel 61 can be deployed lengthwise between the chassis 30 and one of the rigid front anchor stanchions 22 or 122 and heightwise between the upper cable 54 and the lower cable 52 that are attached to the respective front anchor stanchion 22 or 122.

The mobile fall protection unit 20 desirably includes at least a second one of this first type of selectively deployable fall protection device 60 carried by the chassis 30 and positioned on the front leg 31 at the opposite end of the frame 50 to extend along the opposite side of the flatbed 15 when the mobile fall protection unit 20 is positioned at the rear end of the flatbed 15 as shown in FIGS. 5 and 5A for example. Thus, the chassis 30 desirably carries a pair of this type of retractable fall barrier 60, and they desirably are separated from each other by about slightly more than the width of the rear of the flatbed 15. As shown in FIGS. 5, 5A, 6, 7 and 7A for example, the bottom edge of each fencing panel 61 desirably is disposed at an elevation just below the height of the walking surface 15*a* of the flatbed 15. Each such first type of fall barrier 60 provides a readily deployable, temporary fence for protecting workers from falling from one of the longer sides of the flatbed 15.

As shown in FIGS. 1, 5, 5A, 6, 7 and 7A for example, the fencing panel 61 of the fall barrier 60 desirably is formed as a long length of drapeable net or sheet that is rectangular in shape with a width that substantially equals the height of a desired fall protection fence for a flatbed 15. Thus, a typical width of the fencing panel 61 desirably falls in a range of from about 36 inches to about 48 inches. The length of the fencing panel 61 is intended to be long enough to stretch at least from the rear end of the flatbed 15 along the longest side of the flatbed 15 to the front of the flatbed 15 and typically is in a range of 45 feet to 55 feet in length. The fencing panel 61 desirably is formed of material that is strong enough to the task of protecting workers from falling off the side of the flatbed 15 and typically is formed of synthetic fibers woven into a strong synthetic cord that in turn is used to form a net with square openings measuring about three inches on a side and having an area of about nine square inches.

As shown in FIGS. 5-7A for example, the elongated top edge of the fencing panel 61 desirably is defined by a top border strip 62. A plurality of slide rings 62*a* desirably is attached permanently to the top border strip 62. Each slide ring 62*a* desirably is formed from a length of three-eighths inch in diameter cylindrical steel rod that is bent into a circle having an inside diameter of about four inches. Each slide ring 62*a* desirably is formed of powder-coated steel but also can be formed of galvanized steel. Apart from the two individual slide rings 62*a* at each opposite end of the top border strip 62 of the fencing panel 61, each individual slide ring 62*a* desirably is spaced apart from its two nearest neighboring slide rings 62*a* by a linear distance of about two feet when the fencing panel 61 is stretched in a taut condition.

As shown in FIGS. 5-7A for example, the elongated bottom edge of the fencing panel 61 desirably is defined by a bottom border strip 63. A plurality of loops 63*a* desirably is attached permanently to the bottom border strip 63. Each loop 63*a* desirably is formed from a length of one quarter inch in diameter cylindrical steel rod that is bent into a circle having an inside diameter of about two and one half inches. Each loop 63*a* desirably is formed of powder-coated steel but also can be formed of galvanized steel. Apart from the two individual loops 63*a* at each opposite end of the bottom border strip 63 of the fencing panel 61, each individual loop 63*a* desirably is spaced apart from its two nearest neighboring loops 63*a* by a linear distance of about eighteen inches when the net is stretched in a taut condition.

As shown in FIGS. 5 and 5A for example, the narrower end edge at the rear of the fencing panel 61 is defined by a rear border strip 64. As shown in FIGS. 7 and 7A for example, the narrower end edge at the front of the fencing panel 61 is defined by a front border strip 64. Desirably, each of the front border strip 64 and the rear border strip 64 is identically configured. As shown in FIG. 5 for example, one end of each of a plurality of anchoring straps 64*a* desirably is attached permanently to the rear border strip 64. Similarly, as shown in FIG. 7 for example, one end of each of a plurality of anchoring straps 64*a* desirably is attached permanently to the front border strip 64.

As shown in FIGS. 5 and 7 for example, the opposite end of each of the front and rear anchoring straps 64*a* desirably is connected to an attachment clip 64*b* that selectively can be attached and detached by hand to a respective eyelet 26. As shown in FIG. 7 for example, the attachment clip 64*b* on an anchoring strap 64*a* connected to the front border strip 64 desirably can be selectively attached and detached to one of the eyelets 26 that is connected to the rear side of the front anchoring post 22. Similarly, as shown in FIG. 5 for example, the attachment clip 64*b* on an anchoring strap 64*a* connected to the rear border strip 64 desirably can be selectively attached and detached to one of the eyelets 26 that is connected to the front side of a respective front leg 31 of the chassis 30.

As shown in FIG. 5A for example, one end of a center anchoring strap 164*a* desirably is attached permanently at the middle of the rear border strip 64. Similarly, as shown in FIG. 7A for example, one end of a center anchoring strap 164*a* desirably is attached permanently at the middle of the front border strip 64. As shown in FIG. 5A for example, one end of a lower bracing anchor strap 164*c* is attached to the rear border strip 64 and spaced at a distance halfway between where the center anchoring strap 164*a* is attached and the bottom border strip 63 of the fencing panel 61. The opposite end of this lower bracing anchor strap 164*c* is attached to the free end of the center anchoring strap 164*a*. As shown in FIG. 5A for example, one end of an upper bracing anchor strap 164*d* is attached to the rear border strip 64 and spaced at a distance halfway between where the center anchoring strap 164*a* is attached and the top border strip 62 of the fencing panel 61. The opposite end of this upper bracing anchor strap 164*d* is attached to the free end of the center anchoring strap 164*a*.

As shown in FIG. 7A for example, one end of a lower bracing anchor strap 164*c* is attached to the front border strip 64 and spaced a distance halfway between where the center anchoring strap 164*a* is attached and the bottom border strip 63 of the fencing panel 61. The opposite end of this lower bracing anchor strap 164*c* is attached to the free end of the center anchoring strap 164*a*. As shown in FIG. 7A for example, one end of an upper bracing anchor strap 164*d* is attached to the front border strip 64 and spaced a distance halfway between where the center anchoring strap 164*a* is attached and the top border strip 62 of the fencing panel 61. The opposite end of this upper bracing anchor strap 164*d* is attached to the free end of the center anchoring strap 164*a*.

As shown in FIGS. 5A and 7A for example, the end of each of the center anchoring straps 164*a* connected to the respective lower and upper bracing straps 164*c*, 164*d* desirably is connected to an attachment clip 164*b* that selectively can be attached and detached by hand to a respective eyelet 26. As shown in FIG. 7A for example, the attachment clip 164*b* on the center anchoring strap 164*a* connected to the front border strip 64 desirably can be selectively attached and detached to the eyelet 26 that is connected to the rear side of the front anchoring post 122. Similarly, as shown in FIG. 5A for example, the attachment clip 164*b* on the center anchoring strap 164*a* connected to the rear border strip 64 desirably can be selectively attached and detached to the eyelet 26 that is connected to the front side of a respective front leg 31 of the chassis 30.

Each of the top border strips 62, the bottom border strips 63, the front and rear border strips 64 and the anchoring straps 64*a*, 164*a*. 164*c*, 164*d* desirably is formed of a densely woven textile binding that desirably is made of synthetic thread such as polyester for example.

Figure 9A:
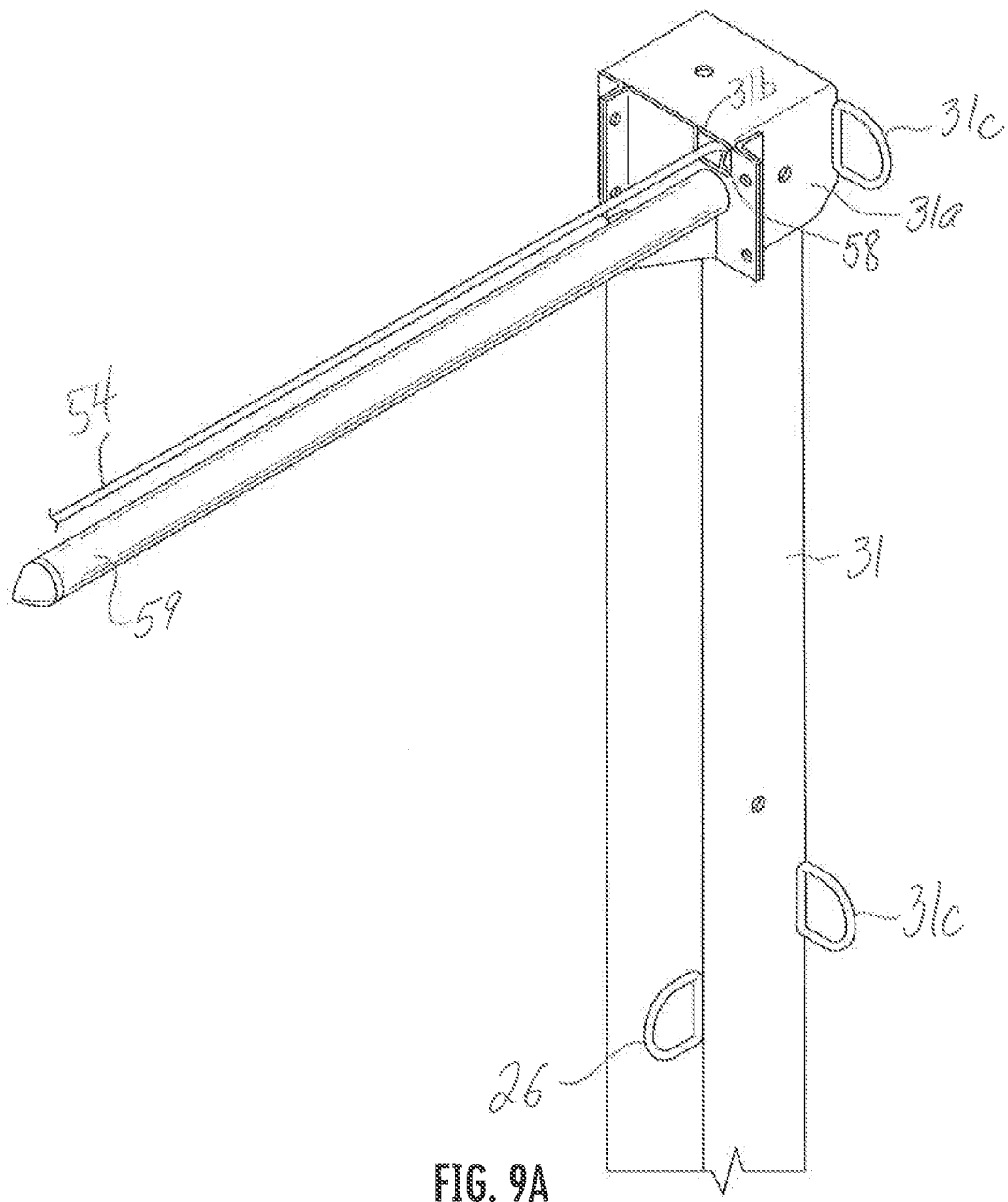
FIG. 9A is an enlarged elevated perspective view from above the right front of components of an embodiment of the present invention depicted in FIGS. 1-3.
Figure 9B:
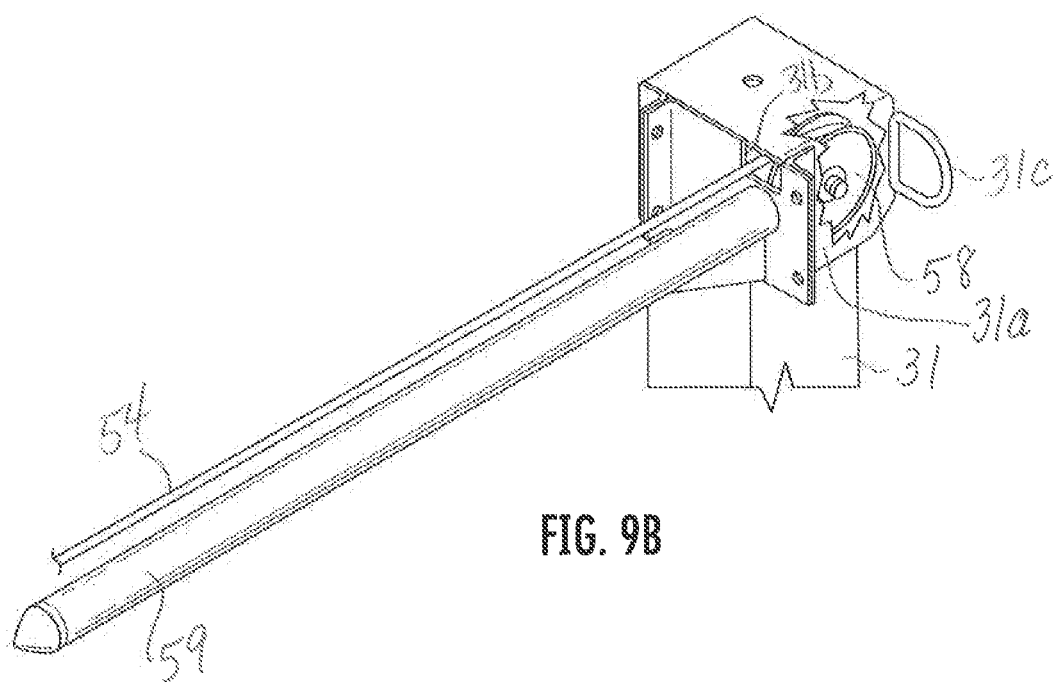
FIG. 9B is an enlarged elevated perspective view of a portion of FIG. 9A with some portions cut away for illustration of components that otherwise would be hidden from the viewer.

As shown in FIGS. 3, 9A and 9B for example, elongating from the front side of the upper end of each front leg 31, there is a cylindrical guide rod 59, which desirably is formed of a one inch inner diameter schedule 40 steel pipe with a domed cap welded to the free end to form the conical free end of the guide rod 59. The opposite end of the guide rod 59 is connected to the upper portion of a front leg 31 and desirably elongates in a straight line in a horizontal direction that is parallel to the ground. As shown in FIGS. 5 and 5A for example, this guide rod 59 elongates in a direction that is roughly coincident with the direction along which the upper cable 54 is to be extended when the upper cable 54 is deployed in the operational mode of the mobile fall protection unit 20. The opposite end of the guide rod 59 is a free end that terminates conically to a point.

When not being deployed in an operative condition that is stretched along the length of a flatbed 15, each respective fencing panel 61 desirably is stored in an accordion-like folded condition with the slide rings 62*a* carried on a respective one of these guide rods 59. As shown in FIGS. 5 and 5A for example, a tie-back 48 desirably can be provided and anchored to the front leg 31. When the fencing panel 61 assumes its accordion-like folded condition, this tie-back 48 can be used by the operator to restrain the bunched together fencing panel 61 against the respective front leg 31. The weight of the fencing panel 61 with the attached rings 62*a*, loops 63*a* and other hardware is about fifty pounds.

FIG. 4 depicts an enlarged perspective view of a lower winch 51, which is attached, as by being mechanically bolted for example, to the base 39*a* of a lower winch platform 34*a*. One opposite end of a lower cable 52 is anchored to the spindle (not visible in the view of FIG. 4) of the reel 51*a* of the lower winch 51. As shown in FIGS. 7 and 7A for example, the opposite end of each lower cable 52 is the free end that is connected to an attachment clip 52*a* such as a carabiner clip that desirably is spring loaded in a closed mode but that selectively can be manipulated by the operator to the open mode for attachment to a suitable receptacle such as one of the rings 24 at lower end of each front anchor stanchion 22 or 122.

In a presently preferred embodiment depicted in FIG. 2A for example, each of the lower winches 51 is disposed so that the reel 51*a* is offset to the outside edge (the edge facing away from the spinal member 32) of the respective leg 31 so that there should be no more than one inch of the actual reel 51*a* situated behind the respective leg 31. In the embodiment shown in FIG. 2A, the lower winch 51 is positioned so that it fits flush with the side of the wider flatbeds 15 and is positioned so that the rub rail of the narrower flatbeds 15 will be spaced apart from the position of the lower winch 51. In this way, the lower cable 52 spools off the reel 51*a* to the outside edge of the respective leg 31. As shown in FIG. 7A for example, for the wider flatbeds 15, this disposition of the reel 51a of the lower winch 51 ensures deployment of the lower cable 52 alongside the rub rail of the flatbed 15 but not touching the rub rail. For the narrower flatbeds 15, this disposition of the reel 51a of the lower winch 51 ensures deployment of the lower cable 52 spaced a small distance away from the outside surface of the rub rail of the flatbed 15. Thus, in both cases (whether narrower or wider flatbeds 15), this position of the lower winch 51 ensures that the fencing panel 61 will be deployed leaving a gap between itself and the outer side edge of the flatbed 15. That gap will be less than 19 inches for narrower flatbeds 15 and desirably less than six inches for wider flatbeds 15 but not so close as to allow the fencing panel 61 or the lower cable 52 to be touching either the outer side edge of the flatbed 15 or the tires that carry the flatbed 15. Thus, in both cases (whether narrower or wider flatbeds 15) in the presently preferred embodiment of FIGS. 2A and 5A, this position of the lower winch 51 ensures that the lower cable 52 does not rub against either the tires that carry the flatbed 15 or the outer surface of the rub rail of the flatbed 15. Similarly, as shown in FIGS. 2A, 4 and 5A for example, each of the upper winches 53 also is disposed so that the reel 53a is offset to the outside edge (the edge facing away from the spinal member 32) of the respective leg 31 so that there should be no more than one inch of the actual reel 51a situated behind the respective leg 31 and the upper cable 54 spools off the reel 53a to the outside edge of the respective leg 31.

As shown in an alternative embodiment of FIG. 2 for example, each of the lower winches 51 is disposed so that the reel 51a is offset to the inside edge (the edge facing toward the spinal member 32) of the respective leg 31 so that there should be no more than one inch of the actual reel 51a situated behind the respective leg 31. In the embodiment shown in FIG. 2, the lower winch 51 is positioned so that it fits flush with the side of the narrower flatbeds 15 and is positioned so that it fits inside of the rub rail on the wider flatbeds 15. In this way, the lower cable 52 spools off the reel 51a to the inner side edge of the respective leg 31. As shown in FIG. 7 for example, for the wider flatbeds 15, this disposition of the reel 51a of the lower winch 51 ensures deployment of the lower cable 52 beneath the underside of the outer side edge of the walking surface 15a of the flatbed 15. For the narrower flatbeds 15, this disposition of the reel 51a of the lower winch 51 ensures deployment of the lower cable 52 at least even with the outer side edge of the walking surface 15a of the flatbed 15. Thus, in both cases (whether narrower or wider flatbeds 15) in this alternative embodiment depicted in FIGS. 2 and 5, this position of the lower winch 51 ensures that the fencing panel 61 will be deployed without leaving a gap between the fencing panel 61 and the outer side edge of the flatbed 15. Similarly, as shown in FIGS. 2, 4 and 5 for example, each of the upper winches 53 also is disposed so that the reel 53a is offset to the inside edge (the edge facing toward the spinal member 32) of the respective leg 31 so that there should be no more than one inch of the actual reel 51a situated behind the respective leg 31 and the upper cable 54 spools off the reel 53a to the inside edge of the respective leg 31.

As shown in FIG. 4 for example, each of the lower winch 51 and the upper winch 53 includes its own hand crank 51b, which is moveable at the option of the operator to each of the three rotatable shafts 56a, 56b and 56c of the respective lower winch 51 and upper winch 53. Each rotatable shaft 56a, 56b and 56c can be rotated forward and backward and is geared to provide a different mechanical advantage with each rotation of the hand crank 51b. For example, when the hand crank 51b of the lower winch 51 is attached to the top shaft 56a, which is connected directly to the spindle of the reel 51a, each single complete rotation of the hand crank 51b produces a single complete rotation of the spindle and the reel 51a, resulting in a 1:1 crank-to-reel rotation. Typically, this top shaft 56a having the 1:1 crank-to-reel rotation would be chosen when the operator is rotating the reel 51a in the backward direction (counterclockwise in FIG. 4) to wind up the lower cable 52 back onto the spindle of the reel 51a.

In the view shown in FIG. 4, the hand crank 51b is attached to the center shaft 56b, which has one opposite end connected to a ratchet wheel 51c and the other opposite end connected to a small diameter gear 51d. Rotation of the center shaft 56b via the hand crank 51b rotates the small diameter gear 51d, which in turn rotates the gear on the reel 53a and thereby effects a 10:1 crank-to-reel rotation ratio. Thus, the operator must completely rotate the hand crank 51b ten times in order to effect a single complete rotation of the spindle and reel 51a.

The bottom shaft 56c is connected to yet another gear (not visible in the view of FIG. 4) that is meshed with the ratchet wheel 51c that is mounted on the end of the center shaft 56b in the foreground of the view of FIG. 4 and in so doing effects a 15:1 crank-to-reel rotation ratio. Rotation of the bottom shaft 56c via the hand crank 51b rotates the gear hidden from view, which in turn rotates the ratchet wheel 51c, which in turn rotates the center shaft 56b and the small diameter gear 51d at the opposite end of the center shaft 56b, and this small diameter gear 51d in turn rotates the gear on the reel 53a and thereby effects a 15:1 crank-to-reel rotational ratio. Thus, the operator must completely rotate the hand crank 51b fifteen times in order to effect a single complete rotation of the spindle and reel 51a. A fifteen-to-one mechanical advantage is not required to tighten the cable, and typically the operator would select the ten-to-one center shaft 56b. Accordingly, though specifically illustrated in FIG. 4, there desirably will be a plastic cover secured over the fifteen-to-one bottom shaft 56c that prevents the operator from using the fifteen-to-one bottom shaft 56c when adjusting the tautness of the cable 52 or 54.

A conventional retention mechanism is provided to maintain the tension in the lower cable 52 and keep the reel 51a from free spooling when the operator's hand releases the hand crank 51b. As shown in FIG. 4 for example, this conventional retention mechanism can be provided in the form of a linkage 57 that includes a rod 57a having each opposite end fixed against rotation to a respective one of the side plates of the lower winch 51. A torsion spring 57b is wound around the rod 57a with one end fixed to the rod 57a and an opposite end (not visible in FIG. 4) attached so as to bias a pawl (not visible in the view of FIG. 4) into the hidden gear. When this pawl is engaged, it is inset into the hidden gear and only allows the hidden gear to rotate in one direction, which is the direction that allows the reel 51a to rotate in the direction (counterclockwise in FIG. 4) that winds the lower cable 52 onto the spindle.

With the pawl engaged and the free end of the lower cable 52 attached to the front anchor post 22 near the bulkhead 16 of the flatbed 15, every rotation of the hand crank 51b in the clockwise direction in FIG. 4 increases the tension on the lower cable 52 as the lower cable 52 winds onto the spindle of the reel 51a, and the pawl prevents rotation of the spindle and the reel 51a in the direction for unwinding of the lower cable 52. Manual release of the pawl eliminates the tension on the lower cable 52 and allows the lower cable 52 to be unwound from the spindle of the reel 51a of the lower winch 51.

FIG. 4 similarly depicts an upper winch 53, which also is desirably is attached, as by being mechanically bolted for example, to the base of an upper winch platform 34b and operates with respect to the upper cable 54 in the same way as the lower winch 51 operates with respect to the lower cable 52. Thus, the upper winch 53 similarly has its own conventional retention mechanism. Moreover, as shown in FIGS. 7 and 7A for example, the free end of the upper cable 54 desirably terminates in an attachment clip 54a that desirably is spring loaded in a closed mode but that selectively can be manipulated by the operator to the open mode for attachment to a suitable receptacle such as one of the loops 25 at upper end of each front anchor stanchion 22 or 122.

As shown in FIGS. 9A and 9B for example, there desirably is a respective pulley 58 that is rotatably mounted at the upper end of each leg 31. Each respective pulley 58 desirably is disposed within the hollow interior of a housing 31a that is mounted atop the respective front leg 31. The housing 31a defines a front window 31b that is an opening into the hollow interior of the housing 31a. Each pulley 58 is configured and disposed to carry the upper cable 54 so that when the mobile flatbed fall protection unit 20 is deployed in its operational mode against the rear end of the flatbed 15, the upper cable 54 is tangentially taken off the pulley 58 in a direction that is toward the front end of the flatbed 15 where the bulkhead 16 (FIGS. 1 and 7) typically is to be found. The upper cable 54 is taken off the reel 53a of the upper winch 53 (FIG. 4) and threaded around the pulley 58 and then through the front window 31b of the pulley housing 31a (FIGS. 9a and 9B) and pulled toward the front of the flatbed 15.

One exemplary manner of deploying a mobile flatbed fall protection unit 20 in its operational mode now will be described. Though none of the figures depicts this pre-operational mode of the mobile fall protection unit 20 as such, when in this pre-operational mode the mobile flatbed fall protection unit 20 has each respective fencing panel 61 hanging by its respective upper slide rings 62a from a respective one of the guide rods 59 and secured by a respective tie-back 48 to the respective front leg 31. As shown in FIG. 3 for example, the two front anchor stanchions 22 are held in their respective stanchion pockets 21 carried on the spinal member 32. To avoid unduly cluttering the view, FIG. 2A only shows one of the two front anchor stanchions 122 is held in its stanchion pocket 21 carried on the spinal member 32.

As shown in FIG. 4 for example, the lower cables 52 and the upper cables 54 are wound around their respective reels 51a, 53a of their respective lower and upper winches 51, 53 carried by each respective front leg 31. What is not shown explicitly in FIG. 4 is the fact that the lower cable 52 will always remain threaded through the loops 63a that are attached permanently to the bottom border strip 62 of the fencing panel 61. Similarly, the upper cable 54 desirably will always remain threaded through the rings that are attached permanently to the top border strip 62 of the fencing panel 61. In this storage mode of the fencing panel 61 before being deployed in operation along one of the sides of a flatbed 15, the attachment clip 52a at free end of lower cable 52 can be hooked onto the lower winch 51 to restrain the lower portion of the fencing panel 61 out of harm's way. Similarly, in this storage mode of the fencing panel 61, the attachment clip 54a at the end of the upper cable 54 can be hooked onto one of the eyelets 26 that is connected to the front side of a respective front leg 31 of the chassis 30.

The mobile chassis 30 of the mobile flatbed fall protection unit 20 is disposed a at one end of the support member (walking surface 15a) of the flatbed 15 with the pair of legs 31 spaced apart widely enough to dispose one leg 31 by one of the sides of the support member 15 and the other leg 31 by the other one of the sides of the support member 15. The operator desirably uses the handle 40 to maneuver the mobile flatbed fall protection unit 20 on its wheels 36a, 36b to a location with its frame 50 against the rear end of the flatbed 15 and its legs 31 disposed to either side of the flatbed 15 as shown in FIGS. 1, 5 and 5A for example. Then the operator sets each respective tie strap 45 on each respective side of the flatbed 15 by extending the tie strap 45 from the respective length-adjustable tensioning device 47 carried on the respective front wheel carriage 35 and using the hook on the free end of the tie strap 45 to anchor the tie strap 45 to the side of the flatbed 15 as shown in FIGS. 5 and 5A for example.

When the operator decides to deploy one of the fencing panels 61 along one side of the flatbed 15, the operator normally will begin the process by removing one of the front anchor stanchions 22 or 122 from the stanchion pocket 21 on the spinal member 32 of the chassis 30 and attach the attachment clip 54a at free end of upper cable 54 to the loop 25 at rear edge of the upper end of front anchor stanchion 22 or 122. In this way, the operator can attach the upper cable 54 to the upper end of front anchor stanchion 22 or 122 without stretching or standing on a ladder or step stool. The operator then ensures that the pawls of the linkages 57 on both the lower winch 51 and the upper winch 53 as shown in FIG. 4 for example are disengaged to allow the respective lower cable 52 and upper cable 54 to be spooled off the respective reel 51a, 53a. With the upper cable 54 attached to the upper end of front anchor stanchion 22 or 122, the operator will walk to the front of the flatbed 15 and insert the ringed end of the front anchor stanchion 22 or 122 through the forward most stanchion pocket 17 at or near the bulkhead 16 at the front end of the flatbed 15 as shown in FIGS. 1, 7 and 7A. By inserting the bottom end of this front anchor stanchion 22 into a stanchion pocket 17 at that location on the flatbed 15, the operator anchors this front anchor stanchion 22 to the flatbed 15. Thus, as shown in FIGS. 7 and 7A for example, an upper section of this front anchor stanchion 22 or 122 extends vertically above the elongated support member 15a of the flatbed 15 and a respective lower section 22a or 122a extends vertically beneath the elongated support member 15a of the flatbed 15.

Desirably, as shown in FIGS. 7 and 7A for example, the operator would attach one end of a tie strap 45 fitted with a length-adjustable tensioning device 47 to the respective front anchoring loop 27 or 127 of the respective front anchor stanchion 22 or 122 and the hook 46 at the opposite end of the tie strap 45 to the side of the flatbed 15. As shown in FIG. 7A, the front anchoring loop 127 of the front anchor stanchion 122 is desirably attached to the one end of the tie strap 45 by a loosely hanging closed belt 127a. In this way, the operator can reach the free end of the belt 127a while standing on the ground and so can attach the tie strap 45 without standing on a ladder or step stool or climbing onto the support surface 15a of the flatbed 15. While the belt 127a is shown in FIG. 7A as hanging loosely downward under the weight of the tensioning device 47 and the tie strap 45, when the tensioning device shortens the deployed length of the tie strap 45, then the belt 127a will be rendered under tension and its tensioned length disposed at an acute angle from the front anchor stanchion 122.

Then, the operator unhooks the attachment clip 52a from the lower winch 51, grabs the free end of the lower cable 52 and pulls the lower cable 52 to the front anchor stanchion 22 or 122 where the clip 52a is secured into the bottom anchoring ring 24 at the lower end of the front anchor stanchion 22 or 122 as shown in FIG. 7 or 7A for example. Now both the upper cable 54 with the attachment clip 54a and the lower cable 52 with the attachment clip 52a are attached to the front anchor stanchion 22 or 122 as shown in FIG. 7 or 7A for example. As shown in FIG. 4 for example, the operator then ensures that the pawls of the linkages 57 are engaged on both of the lower winch 51 and the upper winch 53.

The operator selectively secures one end of the fencing panel 61 to the chassis 30. As shown in FIG. 5A, the operator can manually connect the attachment clip 164b of the rear border strip 64 to the eyelet 26 that is attached to the front leg 31. Alternatively, as shown in FIG. 5, the operator can manually connect each attachment clip 64b of the rear border strip 64 to a respective one of the eyelets 26 that is attached to the front leg 31. In this way, one end of the fencing panel 61 is selectively secured to the chassis 30 by being selectively secured to one of the legs 31 of the chassis 30. When the operator decides to deploy the fencing panel 61, the operator can release the tie-back 48 restraining the fencing panel 61 to the front leg 31. The operator then pulls the front border strip 64 of the fencing panel 61 away from the storage rod 59 on the front leg 31 and to the front anchor stanchion 22. In this way, the operator then deploys a fencing panel 61 lengthwise between the chassis 30 and one of the rigid front anchor stanchions 22 or 122 and heightwise between the upper cable 54 and the lower cable 52.

Though only one fencing panel 61 is depicted in the view shown in FIG. 1, each respective fencing panel 61 on each respective side of the fall protection unit 20 can be stretched out to its full length and deployed along one of the two respective sides of the flatbed 15. Each fencing panel 61 can be pulled manually along the respective lower cable 52 and the respective upper cable 54 and deployed along one respective side of the flatbed 15. The operator then selectively secures one end of the fencing panel 61 to one of the rigid front anchor stanchions 22 or 122. As shown in FIG. 7A for example, the operator can manually connect the attachment clip 164b of each respective front border strip 64 to the eyelet 26 that is attached to the rear side of the front anchor stanchion 122. Similarly, as shown in FIG. 7 for example, the operator can manually connect each respective attachment clip 64b of each respective front border strip 64 to a respective one of the eyelets 26 that is attached to the rear side of the front anchor stanchion 22.

Figure 6:
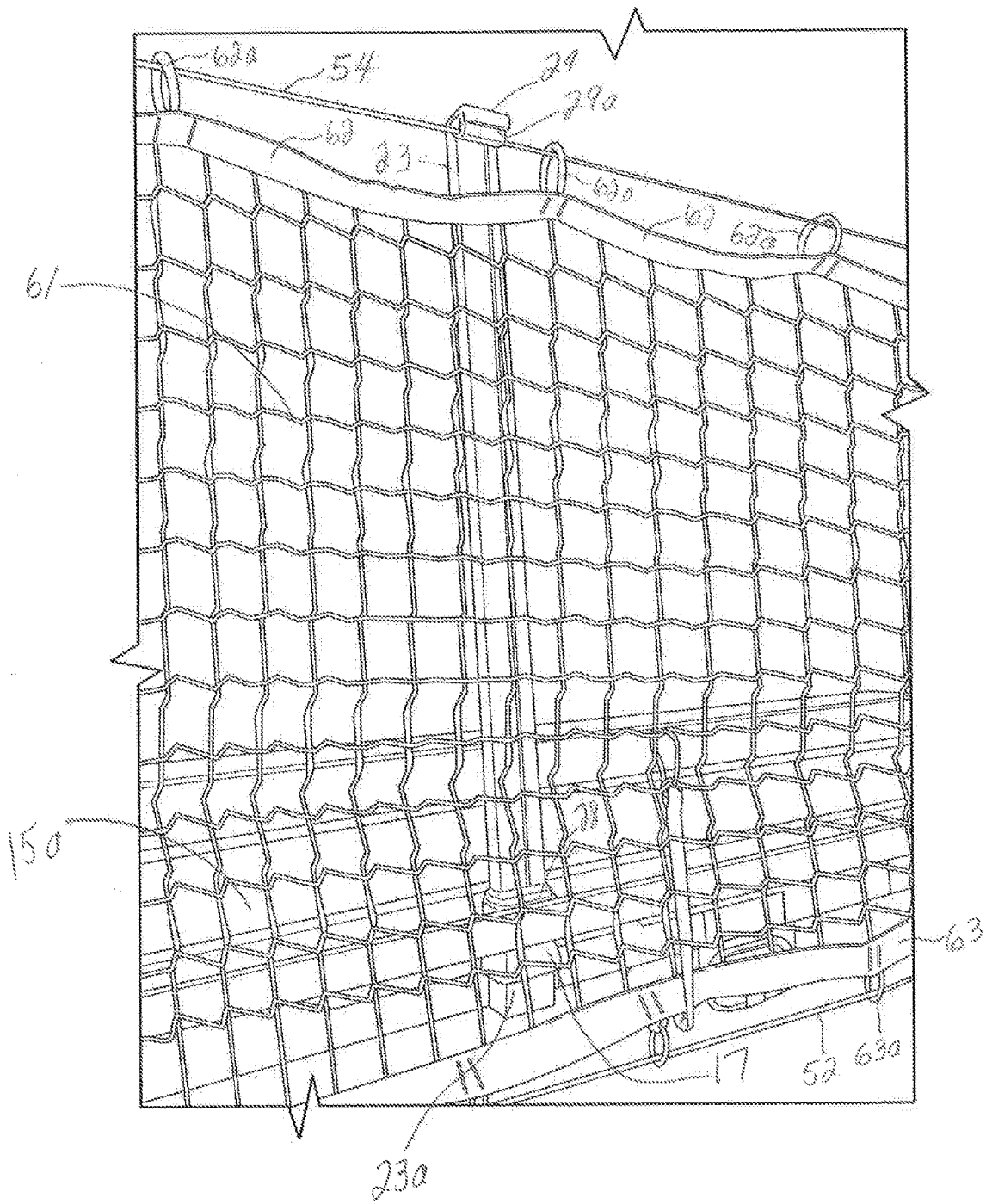
FIG. 6 is a side perspective view of components of an embodiment of the present invention deployed near the center of a flatbed trailer.

As shown in FIGS. 1, 3 and 6 for example, one of the vertically elongating rigid posts held in one of the two stanchion pockets 21 disposed on each side of the spinal member 32 desirably is a center guide stanchion 23. As shown in FIG. 3 for example, the lower section 23a of each center guide stanchion 23 is configured to be received easily and snugly into one of the two stanchion pockets 21. As shown in FIG. 6 for example, the lower section 23a of each center guide stanchion 23 is configured to be received easily and snugly into a stanchion pocket 17 that conventionally is formed in the side of the flatbed 15 in the vicinity of the midpoint along the length of the flatbed 15. A stop collar 28 desirably is attached at one end of the lower section 23a of the center guide stanchion 23 and is configured and disposed so as to prevent the further descent of the center guide stanchion 23 into one of the stanchion pockets 17 typically found in the side of the flatbed 15 or one of the stanchion pockets 21 carried on the side of the spinal member 32 of the chassis 30.

As shown in FIG. 6 for example, at the upper end of each center guide stanchion 23, a cable guide 29 is configured to selectively receive therein an upper cable 54. This cable guide 29 desirably defines a tubular configuration that is open at both axially opposite ends and that includes a slot 29a that elongates for the entire axial length of the cable guide 29. The slot 29a permits the upper cable 54 to be inserted manually into the cable guide 29 or manually removed from the cable guide 29 without having to thread the free end of the upper cable 54 in one end of the cable guide 29 and out the opposite axial end of the cable guide 29.

The operator then would remove a center guide stanchion 23 from its respective stanchion pocket 21 on the spinal member 32 of the chassis 30 and walk to about the middle of the flatbed 15 as shown in FIGS. 1 and 6 for example. There the upper cable 54 would exhibit its maximum sag under the weight of the upper cable 54 and the fencing panel 61. The operator then would insert the upper cable 54 into the cable guide 29 at the upper end of the center guide stanchion 23. Accordingly, the operator would manipulate the upper cable 54 through the slot 29a and into the cable guide 29 that is formed in the upper end of the center guide stanchion 23. The operator then would anchor this center guide stanchion 23 at or near the midpoint between the rear of the flatbed 15 and the bulkhead 16 by inserting the lower section 23a of this center guide stanchion 23 into a central stanchion pocket 17 at that location on the flatbed 15 as shown in FIG. 6 for example. Thus, the middle of the upper cable 54 will be supported in the cable guide 29 and thus compensate for the tendency of the upper cable 54 to sag towards the middle of the fully extended length of the upper cable 54. The rigid center guide stanchion 23 that is anchored at or near the midpoint between the rear of the flatbed 15 and the bulkhead 16 at the front end of the flatbed 15 as shown in FIG. 6 also aids in reducing deflection of the upper cable 54 and fencing panel 61 if someone were to fall against the fencing panel 61 when fully deployed along the respective side of the flatbed 15.

Once the fencing panel 61 is fully deployed as shown in FIG. 1 and secured between the front leg 31 and the front anchor stanchion 22 or 122 with the center guide stanchion in place, the operator then can use the length-adjustable tensioning device 47 to pull the front anchor stanchion 22 or 122 toward the bulkhead 16 of the flatbed 15 and thus support the front anchor stanchion 22 or 122 in a way that tends to reduce the strain on the front anchor stanchion 22 or 122 that otherwise would be imposed by the upper cable 54, the upper winch 53 and the weight of the fencing panel 61.

Then by operating the hand crank 51b on the lower winch 51 and the upper winch 53, the operator can set the desired tension in both the lower cable 52 and the upper cable 54. Thus, the operator uses the lower winch 51 to render the lower cable 52 taut between the lower winch 51 and the lower section 22a of the at least one rigid stanchion 22 and similarly uses the upper winch 53 to render the upper cable 54 taut between the upper winch 53 and the upper section of the at least one rigid stanchion 22.

When the work on the flatbed 15 has been completed, the fencing panels 61, the lower cables 52 and upper cables 54, the center guide stanchions 23 and the front anchor stanchions 22 can be restored to their respective storage positions by reversing the deployment steps outlined above.

As shown in FIGS. 2, 2A and 3 for example, the mobile fall protection unit 20 desirably provides a second type of selectively deployable fall protection device, which includes fence posts 67 that are permanently affixed to the frame 50. Desirably, the position of each fence post 67 between the front legs 31 is maintained in a fixed location. As shown in the presently preferred embodiment depicted in FIG. 2A for example, the bottom end of each fence post 67 desirably is welded to the rear side of the frame 50. As shown in an alternative embodiment depicted in FIG. 2 for example, the bottom end of each fence post 67 is bolted to the rear side of the frame 50.

As shown in FIGS. 2 and 2A for example, a plurality of eyelets 67a is carried by and connected to each opposite side of each respective fence post 67. As shown in FIGS. 2 and 2A for example, an eyelet 67a typically will be positioned on at least one of the opposite sides near the top of each fence post 67 and on at least one of the opposite sides near the midpoint of each fence post 67. Each of the fence posts 67 desirably will have a pair of the eyelets 67a positioned on each of the opposite sides near the top of each fence post 67 and on opposite sides near the midpoint of each fence post 67. As shown in FIG. 3 for example, each front leg 31 desirably will have side eyelets 31c spaced along the length thereof and disposed generally at the same heights to coincide with the eyelets 67a positioned on each of the opposite sides of each immediately adjacent fence post 67.

As shown in FIGS. 2 and 2A for example, the second type of selectively deployable fall protection device desirably includes a plurality of chains 68 that desirably are made of links, which desirably can be formed of zinc-plated steel but also can be formed of galvanized steel. Each chain 68 can be provided for extending between and connected to the pair of fence posts 67. Each opposite free end of each chain 68 desirably is provided with a manually operative latching link 68a that can be selectively connected to as well as disconnected from an eyelet 67a on one of the fence posts 67. A carabiner clip serves as a suitable latching link 68a. In this way, the fence posts 67 and chains 68 provide fall protection from the rear of the flatbed 15.

As shown in FIGS. 1-3 for example, embodiments of the mobile fall protection unit 20 desirably can include a ladder 70 carried by the frame 50 at the front of the chassis 30 and disposed between the two front legs 31. As shown in FIGS. 2 and 2A for example, the ladder 70 includes a pair of side rails 72 and a plurality of rungs 71 that desirably are configured as cylindrical rods. One end of each rung 71 is connected to a respective one of the pair of side rails 72, which are disposed parallel to each other and spaced apart from each other and extend vertically at a slight acute angle from the vertical direction of the force of gravity. As shown in FIGS. 1, 2 and 2A for example, the top rung is provided in the form of a flat step 71a that extends horizontally between the side rails 72.

Additionally, as shown in FIGS. 2, 2A and 3 for example, the ladder 70 desirably is provided with a pair of spaced apart handrails 75 that extend and elongate above the flat step 71a. Each handrail 75 extends vertically from the flat step 71a in a direction that is parallel to the direction in which the other handrail 75 extends so that the worker can grab the handrails 75 when ascending or descending the ladder 70. As shown in FIGS. 2 and 2A, the section of each respective handrail 75 that is located just above the bottom free end 75a is configured to be received through the flat step 71a. As shown in FIG. 2 for example, a collar desirably 75b can be securely connected to both that section of the handrail 75 and the flat step 71a, as by being welded to both. Thus, as shown in FIG. 3 for example, the bottom free end 75a of each respective handrail 75 extends beneath the flat step 71a.

As shown in FIGS. 2-4 for example, the frame 50 desirably includes a first pair of spaced apart holding sleeves 55 attached to the frame 50 at a first side of the frame. Similarly, the frame 50 desirably includes a second pair of spaced apart holding sleeves 55 attached to the frame 50 at a second side of the frame 50 that is opposite the first side of the frame 50. Desirably, each pair of holding sleeves 55 is located between one of the legs 31 and the nearest fence post 67 to that leg 31. Each holding sleeve 55 desirably defines a tubular cavity that is open at both opposite ends. In the embodiment shown in FIGS. 2 and 2A for example, the openings and tubular cavity of each holding sleeve 55 desirably has a rectangular transverse cross-sectional shape that is complementary with the exterior transverse cross-sectional shape of the bottom free end 75a of a handrail 75 of a ladder 70 and thus is configured to receive snugly therein the bottom free end 75a of a handrail 75 of the ladder 70.

Thus, the handrails 75 and the flat step 71a connected to the handrails 75 of the ladder 70 are configured so as to permit the ladder 70 to be carried by and hung from the frame 50 at the front of the chassis 30 so that the workers can ascend the ladder 70 from the ground to the walking surface 15a of the flatbed 15 and descend the ladder 70 from the walking surface 15a of the flatbed 15 to the ground. As shown in FIGS. 2 and 2A, each respective handrail 75 is configured with a respective the bottom free end 75a that slides into a holding sleeve 55 from above the rear of the frame 50. The bottom free ends 75a of the handrails 75 depending below the flat step 71a also permit the ladder 70 to be easily detachable from the frame 50 by lifting the handrails 75 and sliding the bottom free ends 75a out of the holding sleeves 55 from above the frame 50. As there is one pair of holding sleeves 55 disposed near each opposite end of the frame 50, the ladder 70 can be selectively positioned by the operator near either opposite end of the rear of the frame 50. Thus, the ladder 70 and the frame 50 are configured so that the ladder 70 can be carried by the frame 50 and selectively moveable transversely along the frame 50.

As shown in FIGS. 2 and 2A for example, there is a respective pivotal connection 70a between the top end of each respective side rail 72 and a lower end of a respective handrail 75. As shown in FIGS. 2, 2A and 4 for example, located just above the collar 75b that connects each handrail 75 of the ladder 70 to the flat step 71a, there is a section of each handrail 75 to which a hinge plate 75c is attached, as by welding. Each of these hinge plates 75c is pivotally attached via the respective pivotal connection 70a to the upper end of a respective one of the side rails 72 of the ladder 70. As shown in FIGS. 2 and 2A for example, each of the hinge plates 75c desirably is formed by a triangular-shaped plate that has one of its sides attached, as by welding, to the handrail 75.

Thus, the side rails 72 of the ladder 70 desirably are pivotally mounted to the handrails 75 so that the ladder 70 can be deployed selectively as a step ladder from the ground to the height of the walking surface 15a of the flatbed 15 as shown in FIG. 2 for example. As shown in FIG. 3 for example, when the mobile flatbed fall protection unit 20 is not being used, the pivotally mounted side rails 72 of the ladder 70 desirably can be selectively folded up off the ground for storage parallel to the handrails 75 between one of the front legs 31 and one of the fixed fence posts 67. A latch such as a gate style latch (not shown) desirably is provided so that when the latch is engaged, then one of the side rails 72 can be held fixed with respect to one of the handrails 75 of the ladder 70 to retain the ladder 70 in the stored position as shown in FIG. 3 for example.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mobile fall protection unit for a flatbed having an elongated support member that is defined by a pair of elongated opposed sides extending from a rear end carried above ground by a plurality of wheels, the mobile fall protection unit comprising:
    a. a chassis that includes a frame elongating substantially in a horizontal direction parallel to the ground;
    b. a plurality of wheels, each wheel being rotatably connected to the chassis so as to render the chassis mobile along the ground such that the chassis can be maneuvered by hand and brought to the flatbed for use there with;
    c. at least one fall protection device carried by the chassis, the at least one fall protection device including a first fencing panel of drapeable material that defines a rectangular shape and a first cable that is selectively deployable to carry the drapeable material; and
    d. a second fall protection device carried by the chassis, the second fall protection device including a second fencing panel of drapeable material that defines a rectangular shape and a second cable that is selectively deployable to carry the second barrier of drapeable material, the second fall protection device being spaced apart from the first fall protection device in the horizontal direction.

2. The mobile fall protection unit of claim 1, wherein the plurality of wheels rotatably connected to the chassis comprising at least one front wheel carriage.

3. The mobile fall protection unit of claim 2, further comprising a rear wheel carriage pivotally connected to the chassis and spaced apart from the at least one front wheel carriage; a steering fork; and a handle; wherein the steering fork having one end pivotally connected to the rear wheel carriage and an opposite end connected to the handle.

4. The mobile fall protection unit of claim 3, wherein the chassis includes a spinal member having a first end pivotally connected to the rear wheel carriage and an opposite end connected to the frame and disposed at a higher elevation above the rear wheel carriage than the elevation of the first end of the spinal member; and wherein the handle is pivotable into a position to lie substantially parallel to the spinal member.

5. The mobile fall protection unit of claim 1, further comprising a ladder configured to be carried by the frame and selectively moveable transversely along the frame.

6. The mobile fall protection unit of claim 5, further comprising a pair of handrails configured to be received by the frame, each handrail being pivotally connected to the ladder.

7. The mobile fall protection unit of claim 1, wherein at least one fencing panel can be selectively stored bunched together in a folded condition or deployed in a condition stretched out along one of the elongated opposed sides of the flatbed.

8. The mobile fall protection unit of claim 7, wherein the at least one fencing panel is partially defined by a top border strip that extends lengthwise of the fencing panel, the at least one fencing panel also including a plurality of slide rings connected to the top border strip.

9. The mobile fall protection unit of claim 8, wherein at least the first cable being selectively deployable through the plurality of slide rings connected to the top border strip to carry the first fencing panel.

10. The mobile fall protection unit of claim 9, further comprising at least one winch for selectively deploying and storing the first cable and including a retention mechanism for maintaining a desired tension in the first cable.

11. The mobile fall protection unit of claim 8, further comprising at least one vertically elongating rigid stanchion that is selectively deployable to extend vertically from one of the elongated opposed sides of the flatbed near one end of the flatbed to extend vertically above the elongated support member of the flatbed, wherein the chassis includes at least one vertically extending front leg carrying a pulley near the top of the front leg.

12. The mobile fall protection unit of claim 11, wherein at least the first cable is selectively deployable to be carried by the pulley and having a free end that is selectively connectable to the vertically elongating rigid stanchion.

13. The mobile fall protection unit of claim 11, further comprising a C-shaped guard rail fixed to an upper portion of the vertically elongating rigid stanchion.

14. The mobile fall protection unit of claim 9, further comprising at least one vertically elongating rigid stanchion that is selectively deployable to extend vertically from one of the elongated opposed sides of the flatbed near one end of the flatbed and having an upper section that extends vertically above the elongated support member of the flatbed and having a lower section that extends vertically beneath the elongated support member of the flatbed, wherein the chassis includes at least one vertically extending front leg carrying a first winch, one end of the first cable being connected to the first winch and an opposite end of the first cable selectively connectable to the vertically elongating rigid stanchion.

15. The mobile fall protection unit of claim 14, wherein the opposite end of the first cable has an attachment clip that is selectively connectable to the upper section of the vertically elongating, rigid stanchion.

16. The mobile fall protection unit of claim 14, wherein the opposite end of the first cable has an attachment clip that is selectively connectable to the lower section of the vertically elongating rigid stanchion.

17. The mobile fall protection unit of claim 1, further comprising:
    wherein the plurality of wheels rotatably connected to the chassis defines a front wheel carriage; and
    a rear wheel carriage pivotally connected to the chassis, which includes a spinal member having a first end connected to the frame and an opposite second end connected to the rear wheel carriage such that the first end of the spinal member is disposed at a higher elevation than the second end of the spinal member; and wherein each of the plurality of wheels is rotatably connected is one of the front wheel carriage and the rear wheel carriage.

18. A mobile fall protection unit for a flatbed having an elongated support member that is defined by a pair of elongated opposed sides extending from a rear end carried above ground by a plurality of wheels, the mobile fall protection unit comprising:

a chassis that includes a frame elongating substantially in a horizontal direction parallel to the ground;

a plurality of wheels, each wheel being rotatably connected to the chassis so as to render the chassis mobile along the ground such that the chassis can be maneuvered by hand and brought to the flatbed for use there with;

at least one selectively deployable fall protection device carried by the chassis;

wherein the at least one selectively deployable fall protection device includes a fencing panel that can be selectively stored bunched together in a folded condition or deployed in a condition stretched out along one of the elongated opposed sides of the flatbed;

wherein the fencing panel is partially defined by a top border strip that extends lengthwise of the fencing panel, the fencing panel also including a plurality of slide rings connected to the top border strip;

at least a first cable selectively deployable through the plurality of slide rings connected to the top border strip to carry the fencing panel;

at least one vertically elongating rigid stanchion that is selectively deployable to extend vertically from one of the elongated opposed sides of the flatbed near one end of the flatbed and having an upper section that extends vertically above the elongated support member of the flatbed and having a lower section that extends vertically beneath the elongated support member of the flatbed, wherein the chassis includes at least one vertically extending front leg carrying a first winch, one end of the first cable being connected to the first winch and an opposite end of the first cable selectively connectable to the vertically elongating rigid stanchion; and a second winch carried on the at least one vertically extending front leg; a second cable having one opposite end connected to the second winch; wherein a second opposite end of the second cable being selectively connectable to the lower section of the vertically elongating rigid stanchion; and wherein the first cable has an attachment dip that is selectively connectable to the upper section of the vertically elongating rigid stanchion.

19. The mobile fall protection unit of claim 18, further comprising:

wherein the plurality of wheels rotatably connected to the chassis defines a front wheel carriage; and a rear wheel carriage pivotally connected to the chassis, which includes a spinal member having a first end connected to the frame and an opposite second end connected to the rear wheel carriage such that the first end of the spinal member is disposed at a higher elevation than the second end of the spinal member; and wherein each of the plurality of wheels is rotatably connected to one of the front wheel carriage and the rear wheel carriage.

\* \* \* \* \*